United States Patent
Kalayjian et al.

(10) Patent No.: US 8,073,980 B2
(45) Date of Patent: Dec. 6, 2011

(54) METHODS AND SYSTEMS FOR AUTOMATIC CONFIGURATION OF PERIPHERALS

(75) Inventors: Nicholas Kalayjian, San Carlos, CA (US); Stanley Rabu, Santa Clara, CA (US); Jeffrey Terlizzi, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 12/966,580

(22) Filed: Dec. 13, 2010

(65) Prior Publication Data

US 2011/0086643 A1   Apr. 14, 2011

Related U.S. Application Data

(63) Continuation of application No. 11/638,251, filed on Dec. 12, 2006, now Pat. No. 8,006,002.

(51) Int. Cl.
*G06F 15/16* (2006.01)
*G06F 13/00* (2006.01)

(52) U.S. Cl. ............. 709/250; 710/62; 710/105; 710/36

(58) Field of Classification Search .............. 710/15–19, 710/62–64, 105–106, 36–46; 455/519, 11.1; 709/250

See application file for complete search history.

(56) References Cited

U.S. PATENT DOCUMENTS

| | | |
|---|---|---|
| 5,095,945 A | 3/1992 | Jensen et al. |
| 5,103,085 A | 4/1992 | Zimmerman |
| 5,270,818 A | 12/1993 | Ottenstein |
| 5,406,305 A | 4/1995 | Shimomura et al. |
| 5,528,266 A | 6/1996 | Arbeitman et al. |
| 5,684,294 A | 11/1997 | Kouhi |
| 5,884,156 A | 3/1999 | Gordon |
| 5,894,298 A | 4/1999 | Hoeksma |
| 5,952,992 A | 9/1999 | Helms |
| 6,208,854 B1 | 3/2001 | Roberts et al. |
| 6,246,862 B1 | 6/2001 | Grivas et al. |
| 6,289,453 B1 | 9/2001 | Walker et al. |

(Continued)

FOREIGN PATENT DOCUMENTS

EA   1355223   10/2003

(Continued)

OTHER PUBLICATIONS

Supplemental European Search Report mailed Apr. 21, 2011 for EP Appln No. 07863192.6.

(Continued)

*Primary Examiner* — Christopher B Shin
(74) *Attorney, Agent, or Firm* — Blakely, Sokoloff, Taylor & Zafman LLP

(57) ABSTRACT

Peripherals and data processing systems are disclosed which can be configured to interact based upon sensor data. In one embodiment, a peripheral, which is configured to be used with a data processing system, includes an interface to couple the peripheral to the data processing system, and at least one sensor, such as a proximity sensor, to sense a user of the peripheral, and a processor coupled to the interface and to the at least one sensor, wherein the processor configures the peripheral in response to data from the at least one sensor. The peripheral may communicate sensor data from its sensors to the data processing system, which may be a wireless PDA, and the data processing system analyzes the sensor data from its sensors and from the peripheral's sensors to decide how to configure the peripheral and/or the data processing system based on the sensor.

7 Claims, 19 Drawing Sheets

U.S. PATENT DOCUMENTS

| | | | |
|---|---|---|---|
| 6,373,612 | B1 | 4/2002 | Hoffman et al. |
| 6,477,374 | B1 | 11/2002 | Shaffer et al. |
| 6,520,013 | B1 | 2/2003 | Wehrenberg |
| 6,522,697 | B1 | 2/2003 | Spickermann |
| 6,583,676 | B2 | 6/2003 | Krah et al. |
| 6,601,012 | B1 | 7/2003 | Horvitz et al. |
| 6,664,744 | B2 | 12/2003 | Dietz |
| 6,803,920 | B2 | 10/2004 | Gossett et al. |
| 6,812,466 | B2 | 11/2004 | O'Connor et al. |
| 6,822,635 | B2 | 11/2004 | Shahoian et al. |
| 6,947,017 | B1 | 9/2005 | Gettemy |
| 6,947,571 | B1 | 9/2005 | Rhoads et al. |
| 6,956,564 | B1 | 10/2005 | Williams |
| 7,016,705 | B2 | 3/2006 | Bahl et al. |
| 7,019,622 | B2 | 3/2006 | Orr et al. |
| 7,117,021 | B2 | 10/2006 | Shearer et al. |
| 7,117,380 | B2 | 10/2006 | Kangas |
| 7,171,221 | B1 | 1/2007 | Amin et al. |
| 7,209,719 | B2 | 4/2007 | Liebenow |
| 7,522,065 | B2 | 4/2009 | Falcon |
| 7,605,693 | B2 | 10/2009 | Kulas |
| 7,633,076 | B2 | 12/2009 | Huppi et al. |
| 2001/0031633 | A1 | 10/2001 | Tuomela et al. |
| 2002/0065099 | A1 | 5/2002 | Bjorndahl |
| 2002/0167488 | A1 | 11/2002 | Hinckley et al. |
| 2003/0022666 | A1 | 1/2003 | Sato |
| 2003/0095096 | A1 | 5/2003 | Robbin et al. |
| 2003/0108300 | A1 | 6/2003 | Walker et al. |
| 2003/0224726 | A1 | 12/2003 | Shearer et al. |
| 2004/0012556 | A1 | 1/2004 | Yong et al. |
| 2004/0110472 | A1 | 6/2004 | Witkowski et al. |
| 2004/0180649 | A1 | 9/2004 | Vogel et al. |
| 2004/0203351 | A1 | 10/2004 | Shearer et al. |
| 2004/0213576 | A1 | 10/2004 | Tan et al. |
| 2004/0224638 | A1 | 11/2004 | Fadell et al. |
| 2004/0233153 | A1 | 11/2004 | Robinson |
| 2004/0245438 | A1 | 12/2004 | Payne et al. |
| 2005/0057169 | A1 | 3/2005 | Noguchi et al. |
| 2005/0132416 | A1 | 6/2005 | Wasilewski |
| 2005/0168658 | A1 | 8/2005 | Woolgar et al. |
| 2005/0171662 | A1* | 8/2005 | Strege et al. ............. 701/33 |
| 2005/0190142 | A1 | 9/2005 | Ferguson |
| 2005/0219223 | A1 | 10/2005 | Kotzin et al. |
| 2005/0219228 | A1 | 10/2005 | Alameh et al. |
| 2005/0219394 | A1 | 10/2005 | Du et al. |
| 2005/0221791 | A1 | 10/2005 | Angelhag |
| 2006/0017692 | A1 | 1/2006 | Wehrenberg et al. |
| 2006/0026521 | A1 | 2/2006 | Hotelling et al. |
| 2006/0026535 | A1 | 2/2006 | Hotelling et al. |
| 2006/0052141 | A1* | 3/2006 | Suzuki ............. 455/569.1 |
| 2006/0060762 | A1 | 3/2006 | Chan et al. |
| 2006/0087245 | A1 | 4/2006 | Ng et al. |
| 2006/0097991 | A1 | 5/2006 | Hotelling et al. |
| 2006/0116175 | A1 | 6/2006 | Chu |
| 2006/0117108 | A1 | 6/2006 | Salisbury et al. |
| 2006/0146012 | A1 | 7/2006 | Arneson et al. |
| 2006/0161870 | A1 | 7/2006 | Hotelling et al. |
| 2006/0161871 | A1 | 7/2006 | Hotelling et al. |
| 2006/0164241 | A1 | 7/2006 | Makela et al. |
| 2006/0199536 | A1 | 9/2006 | Eisenbach |
| 2006/0290921 | A1 | 12/2006 | Hotelling |
| 2006/0291863 | A1 | 12/2006 | Chan et al. |
| 2007/0003289 | A1 | 1/2007 | Tan et al. |
| 2007/0042714 | A1* | 2/2007 | Ayed ............. 455/41.2 |
| 2007/0046629 | A1 | 3/2007 | Chi-Boon et al. |
| 2007/0057773 | A1 | 3/2007 | Hsieh et al. |
| 2007/0075965 | A1 | 4/2007 | Huppi et al. |
| 2007/0085157 | A1 | 4/2007 | Fadell et al. |
| 2007/0099574 | A1 | 5/2007 | Wang |
| 2007/0123171 | A1 | 5/2007 | Slamka et al. |
| 2007/0123287 | A1* | 5/2007 | Mock et al. ............. 455/518 |
| 2007/0135091 | A1* | 6/2007 | Wassingbo ............. 455/410 |
| 2007/0135151 | A1* | 6/2007 | Dendy ............. 455/517 |
| 2007/0161410 | A1 | 7/2007 | Huang et al. |
| 2007/0225047 | A1 | 9/2007 | Bakos |
| 2007/0233759 | A1 | 10/2007 | Tomlinson et al. |
| 2007/0239903 | A1 | 10/2007 | Bhardwaj et al. |
| 2007/0266185 | A1 | 11/2007 | Goddi et al. |
| 2007/0293188 | A1 | 12/2007 | Houghton et al. |
| 2008/0006762 | A1 | 1/2008 | Fadell et al. |
| 2008/0031206 | A1 | 2/2008 | Sharma |
| 2008/0090617 | A1 | 4/2008 | Sutardja |
| 2008/0102882 | A1 | 5/2008 | Sutardja |
| 2008/0113618 | A1 | 5/2008 | De Leon et al. |
| 2008/0192129 | A1 | 8/2008 | Walker et al. |
| 2009/0047904 | A1 | 2/2009 | Preston et al. |
| 2009/0098865 | A1* | 4/2009 | Vaghi et al. ............. 455/417 |
| 2009/0244092 | A1 | 10/2009 | Hotelling |
| 2009/0313473 | A1 | 12/2009 | Walker et al. |

FOREIGN PATENT DOCUMENTS

| | | |
|---|---|---|
| EA | 1465462 | 10/2004 |
| EM | 1696414 | 8/2006 |
| EP | 0992969 | 4/2000 |
| EP | 1185058 | 3/2002 |
| EP | 1335430 | 8/2003 |
| EP | 1452988 | 9/2004 |
| EP | 1507132 | 2/2005 |
| EP | 1507196 | 2/2005 |
| EP | 1650938 | 4/2006 |
| EP | 1667103 | 6/2006 |
| EP | 1696414 | 8/2006 |
| GB | 2346500 | 8/2000 |
| GB | 2418808 | 4/2006 |
| JP | 05-323277 | 12/1993 |
| JP | 2001244498 | 9/2001 |
| JP | 2007-163872 | 6/2007 |
| WO | WO-2004/093045 | 10/2004 |
| WO | WO-2005/101176 | 10/2005 |

OTHER PUBLICATIONS

IrDA Physical Layer Implementation for Hewlett Pacards Infrared Products.

PCT Search Report mailed Aug. 21, 2008; PCT/US2007/026130.

"Apple Inc.", International Preliminary Report on Patentability mailed May 28, 2009; PCT Application No. PCT/US2007/023124.

"Apple Inc.", International Preliminary Report on Patentability mailed May 7, 2009; PCT Application No. PCT/US2007/022335.

"Apple Inc,", International Preliminary Report on Patentability mailed Jul. 16, 2009; PCT Application No. PCT/US2007/026164.

"Apple Inc,", International Preliminary Report on Patentability mailed Jul. 16, 2009; PCT Application No. PCT/US2007/026141.

"Proximity Sensor Demo Kit User Guide, Version 0.62-Preliminary", Integration Associates, Inc.; 2004, 17 pages.

Agilent Technologies Inc., "Agilent unveils optical proximity sensor for mobile appliances", http:/www.embeddedstar.com/press/content/2004/8/embedded16015.html, (Aug. 31, 2004), 2 pages.

Apple Inc., International Preliminary Report on Patentability mailed Jul. 16, 2009; PCT Application No. PCT/US2007/026130.

Apple Inc., PCT Search Report mailed Jun. 3, 2008; PCT/US2007/026164.

Apple Inc., "PCT Notification of Transmittal of the International Search Report and the Written Opinion of the International Searching Authority", PCT/US2007/022335, (Feb. 18, 2008).

Apple Inc., "PCT SearchReport and Written Opinion mailed Jul. 3, 2008", PCT/US2007/023124, 14 pages.

CNET News.com, "Reinventing the Scroll Wheel", Photo 1, http://news.com/2300-1041_3-6107951-1.html?tag=ne.gall.pg, (Aug. 22, 2006), 2 pages.

CNET News.com, "Reinventing the Scroll Wheel", Photo 2, http://new.com/2300-1041_3-6107951-2.html?tag=ne.gall.pg, (Aug. 22, 2006), 2 pages.

CNET News.com, "Reinventing the Scroll Wheel", Photo 3, http://news.com/2300-1041_3-6107951-3.html?tag=ne.gall.pg, (Aug. 22, 2006), 2 pages.

CNET News.com, "Reinventing the Scroll Wheel", Photo 4, http://news.com/2300-1041_3-6107951-4.html?tag=ne.gall.pg, (Aug. 22, 2006), 2 pages.

CNET News.com, "Reinventing the Scroll Wheel", Photo 5, http://news.com/2300-1041_3-6107951-5.html?tag=ne.gall.pg, (Aug. 22, 2006), 2 pages.

CNET News.com, "Reinventing the Scroll Wheel", Photo 6, http:news,com/2300-1041_3-6107951-6.html?tag=ne.gall.pg, (Aug. 22, 2006), 2 pages.

CNET News.com, "Reinventing the Scroll Wheel", Photo 7, http://news.com/2300-1041_3-6107951-7.html?tag=ne.gall.pg, (Aug. 22, 2006), 2 pages.

CNET News.com, "Reinventing the Scroll Wheel", Photo 8, http://news.com/2300-1041_3-6107951-8.html?tag=ne.gall.pg, (Aug. 22, 2006), 2 pages.

Kennedy, "Methods and Apparatuses for Configuration Automation", U.S. Appl. No. 10/805,144, 59 pages.

Roos, Gina , "Agilent's new proximity sensor beats the fumble-fingered competition hands down . . . literally", eeProductCenter, URL:http://www.eeproductcenter.com/showArticle.jhtml?articleID 46200544, (Sep. 1, 2004), 3 pages.

Universal Remote Control, Inc., "All Complete Control Remotes Now Use Narrow Band RF", http://www.universalremote.com/corporate/press_release.php?press=13, (2008).

Universal Remote Control, Inc., "MX-950 (The Aurora)", www.unversalremote.com, (2005).

Universal Remote Control, Inc., "Operating System with the Aurora MX-950", *MX-950 Owners Manual*, (2005).

* cited by examiner

| HEADSET PROXIMITY | PHONE PROXIMITY | ENABLE AUDIO ON |
|---|---|---|
| far | close | phone |
| close | far | headset |
| close | close | headset |

275 → (row 1), 277 → (row 2), 279 → (row 3)

FIG. 3A

METHODS AND SYSTEMS FOR AUTOMATIC CONFIGURATION OF PERIPHERALS

This application is a continuation of U.S. patent application Ser. No. 11/638,251, filed on Dec. 12, 2006 now U.S. Pat. No. 8,006,002, entitled "Methods and Systems for Automatic Configuration of Peripherals."

BACKGROUND OF THE INVENTION

Electronic devices, such as computer systems or wireless cellular telephones or other data processing systems, may often be used with peripheral devices. A peripheral device, such as a wired or wireless headset or a wireless or wired keyboard or a wired or wireless cursor control device, is coupled to the electronic device which may be referred to as a host system. The peripheral typically provides input and/or output capabilities to the electronic device.

The peripheral may also be configured to operate with only one particular electronic device or host. For example, a wireless headset peripheral may be paired with a designated wireless cellular telephone so that it communicates with that designated wireless cellular telephone rather than other wireless cellular telephones which are within radio range of the wireless headset. This allows a user to operate the wireless headset with its designated wireless cellular telephone even though it may be surrounded by other wireless cellular telephones which are within the radio range of the wireless headset. Thus, the wireless headset in this case includes some intelligence or data which allows it to selectively operate with a designated host system, but there is no further processing or sensing capability in the wireless headset. A Bluetooth pairing or partnership is an example of a relationship created between a peripheral and a host. It is created by the user in order to exchange information in a secure manner. Creating a Bluetooth partnership between two devices involves entering the same personal identification number (PIN) or passkey on both devices; creating such a partnership is a one-time process. Once a partnership is created, the devices can recognize the partnership and exchange information without entering a PIN again.

Certain wireless telephones described previously include sensors, such as a proximity sensor, which are used to determine a context of the system that relates to how a user is using the system. However, those wireless telephones rely on sensors on the telephone to determine the context.

SUMMARY OF THE DESCRIPTION

At least certain embodiments of the inventions relate to peripherals which include at least one sensor which senses a state of the peripheral. In these embodiments, a peripheral and/or a host to which it is coupled may be capable of automatically altering one or more configurations of the peripheral or the host or both in response to the data from the at least one sensor.

In at least certain embodiments, a peripheral and its associated data processing system, which may be considered a host system, may be capable of working together to determine a user's intent or actions based on sensor data from at least one sensor on the peripheral or the host or both. For example, a set of sensors (such as, for example, a proximity sensor and an ambient light sensor) on the peripheral may provide data which indicate that the peripheral is not proximate to the user while another set of sensors on the host may provide data which indicate that the host is near to the user's ear; in this situation, the peripheral and the host may exchange data (e.g. data from sensors) and instructions which automatically cause a change in configuration of the peripheral and/or the host in response to the sensor data. If, in this example, the peripheral is a wireless headset and the host is a wireless cellular telephone, then the peripheral may transmit its sensor data to the host which processes this sensor data along with sensor data from the host to determine that the user is holding the phone against the user's ear and the headset is not close to the user and hence the host will automatically enable the host's speaker and microphone and will transmit an instruction to the headset to cause it to disable the headset's speaker and microphone.

In one embodiment, a peripheral includes an interface to couple the peripheral to a data processing system, at least one sensor to sense a user or context of the peripheral, and a processor coupled to the interface and to the at least one sensor, the processor configuring the peripheral in response to data from the at least one sensor. The peripheral may be a wired or wireless headset, or a wired or wireless keyboard, or a wired or wireless cursor control device, or other types of peripherals designed to work with the data processing system. In one embodiment, the data processing system includes an interface to couple the data processing system to the peripheral, at least one sensor to sense the user or a context of the data processing system, and at least one processor coupled to the interface and to the at least one sensor. The data processing system may be any one of: a general purpose computer system, a special purpose computer system, a personal digital assistant (PDA), a wireless mobile cellular telephone, an entertainment system, a wireless mobile telephone which includes PDA functionality, or other types of data processing systems which operate with peripherals.

In another embodiment, a data processing system includes at least one processor, a memory coupled to the at least one processor, a network interface configured to be coupled to a data network which is capable of providing voice over the data network, the network interface being coupled to the at least one processor, and a connector interface configured to be coupled to a wireless mobile telephone which communicates through a wireless cellular network, the connector interface being coupled to the at least one processor, wherein the at least one processor is configured to route, automatically, data of a communication through the data network to the wireless mobile telephone in response to the wireless mobile telephone being disconnected from the connector interface during the communication. In an embodiment, the wireless mobile telephone includes at least one processor, a memory coupled to the at least one processor, a radio frequency (RF) wireless transceiver coupled to the at least one processor, the RF wireless transceiver configured to communicate with a wireless cellular network, and a port coupled to the at least one processor, the port being configured to be coupled to the connector interface of a data processing system which is coupled to the data network, wherein the processor is configured to route, automatically, data of a communication through the data network to the wireless mobile telephone in response to the wireless mobile telephone being disconnected from the connector interface during the communication. The communication may be a phone call through a VOIP network or may be an instant message communication through the data network. The wireless mobile telephone may include an RF transceiver, coupled to the at least one processor of the wireless mobile telephone, for wirelessly communicating with the data processing system through a wireless local area network (WLAN) or a wireless personal area network (WPAN), and the data processing system may also include a similar RF transceiver.

In another embodiment, a data processing system includes at least one processor, a user interface system coupled to the at least one processor, a memory coupled to the at least one processor, and a connector interface configured to be coupled to a wireless mobile telephone which communicates through a wireless cellular network; the connector interface is coupled to the at least one processor which is configured to route, automatically, data of a communication through the wireless cellular network to the user interface system in response to the wireless mobile telephone's being connected to the connector interface during the communication. In an embodiment, the wireless mobile telephone includes at least one processor, a memory coupled to the at least one processor, an RF wireless transceiver coupled to the at least one processor, and a port coupled to the at least one processor, the port being configured to be coupled to a connector interface of the data processing system. The RF wireless transceiver of the telephone is configured to communicate with a wireless cellular network. The processor of the telephone is configured to route, automatically, data of a communication through the wireless cellular network to a user interface system of the data processing system in response to the wireless mobile telephone being connected to the connector interface during the communication. Other systems and methods are also described, and machine readable media, which contain executable instructions to cause a machine to operate as described herein, are also described.

BRIEF DESCRIPTION OF THE DRAWINGS

The present invention is illustrated by way of example and not limitation in the figures of the accompanying drawings in which like references indicate similar elements.

FIG. 3A shows, in table form, an example of how sensor data from a proximity sensor on a wireless headset and sensor data from a proximity sensor on a wireless mobile cellular telephone are used together to modify an audio configuration setting on both the telephone and the headset.

DETAILED DESCRIPTION

Figure 1:
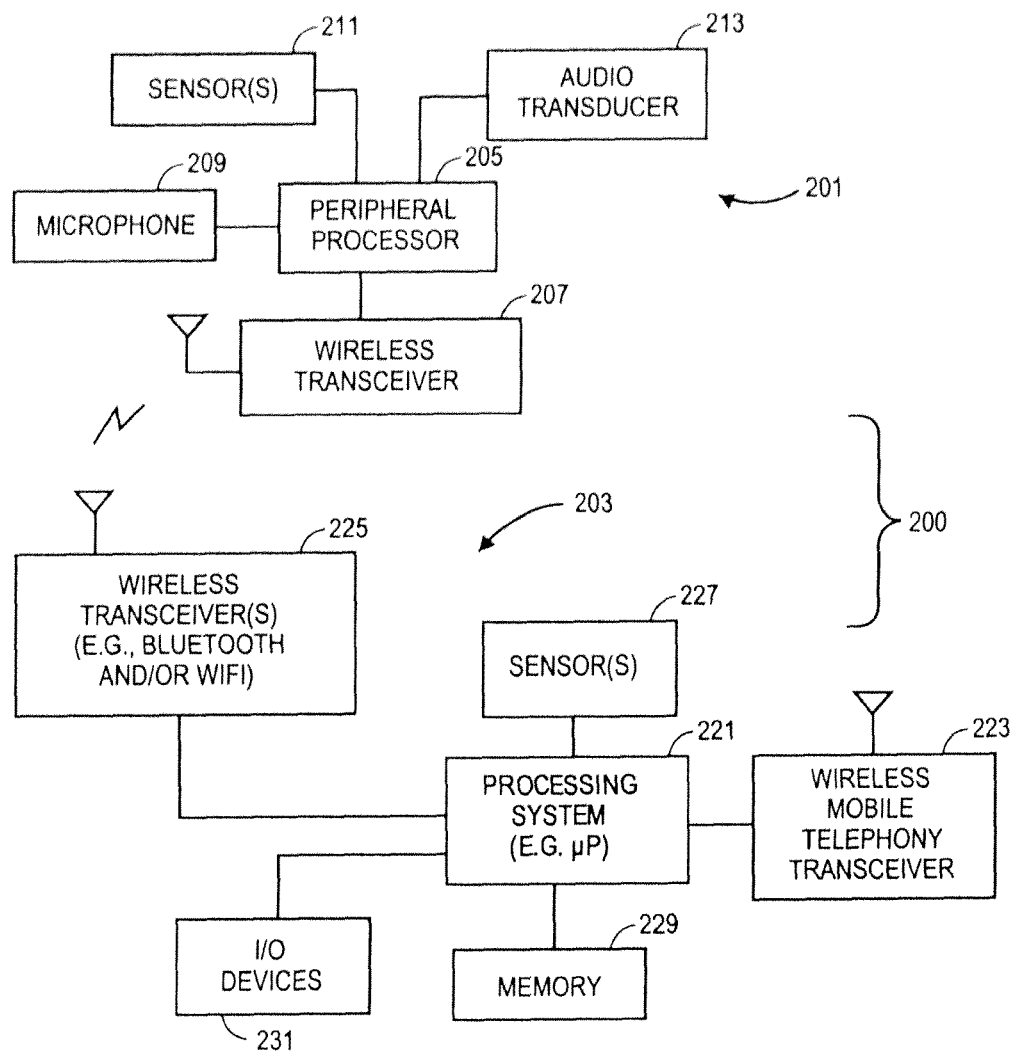
FIG. 1 shows an example of a system which includes an example of a peripheral and an example of a data processing system which is used with the peripheral.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a through understanding of various embodiments of the present invention. However, in certain instances, well-known or conventional details are not described in order to provide a concise discussion of embodiments of the present inventions.

Some portions of the detailed descriptions which follow are presented in terms of algorithms which include operations on data stored within a computer memory. An algorithm is generally a self-consistent sequence of operations leading to a desired result. The operations typically require or involve physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices.

The present invention can relate to an apparatus for performing one or more of the operations described herein. This apparatus may be specially constructed for the required purposes, or it may comprise a general purpose computer selectively activated or reconfigured by a computer program stored in the computer. Such a computer program may include instructions for performing the operations described herein and may be stored in a machine (e.g. computer) readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a bus.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

FIG. 1 shows an example of a system 200 which includes a peripheral 201, which may also be referred to as an accessory, and a data processing system 203 which is designed to exchange data with the peripheral 201. In the example of FIG. 1, the peripheral 201 may be a wireless headset which communicates with the data processing system 203 through a wireless personal area network (WPAN) interface, such as a Bluetooth interface, and the data processing system 203 may be a wireless mobile cellular telephone or a personal digital assistant (PDA) which also includes a wireless mobile cellular telephone or a general purpose computer system, such as a handheld computer which includes a wireless mobile cellular telephone. It will be appreciated that while a particular type of peripheral and a particular type of data processing system are shown in FIG. 1, other types of peripherals and data processing systems may be used in alternative embodiments. For example, in alternative embodiments, a peripheral may be a wired headset or a wired or wireless keyboard or a wired or wireless cursor control device or other wired or wireless input or output devices; in other cases, the peripheral may be considered to be a data processing device which is similar to a PDA or cellular telephone or general purpose computer system. In alternative embodiments, the data processing system may be a general purpose computer system, or special purpose computer system, or an entertainment system, or a PDA or an embedded device within another device, or a media player, etc. The peripheral 201 includes a peripheral processor 205 which is coupled to one or more sensors 211, an audio transducer 213 (which may be a speaker), a microphone 209, and a wireless transceiver 207. The peripheral processor 205 controls the operation of peripheral 201 by operating the wireless transceiver 207, which may be, for example, a Bluetooth or WiFi transceiver or other types of transceivers used to create a wireless local area network (WLAN) or a WPAN, and by operating the microphone 209 and the audio transducer 213, in response to signals from the wireless transceiver and/or the sensors and/or processes executing on the peripheral processor 205. The peripheral processor 205 may be coupled to audio codecs (not shown) or other devices to drive or receive input from the audio transducer and the microphone respectively. In the case where peripheral 201 is a wireless headset for a telephone, the wireless transceiver 207 establishes a wireless communication link with a telephone which acts as a host data processing system and which sends audio data to be played by the speaker (audio transducer 213) and which receives audio data from the microphone 209. Thus, the wireless headset acts in the same manner as a wired headset on a telephone. The sensors 211 may be one or more sensors on the peripheral 201 which are designed to detect or measure user activity or a device context. The sensors 211 may include, for example, a proximity sensor and/or an ambient light sensor and/or an accelerometer and/or other sensors described herein. The sensor(s) 211 provides sensor data (e.g. proximity data) to the peripheral processor 205 which may process this data or may transmit, as described below, the sensor data to the data processing system for processing.

The data processing system 203 includes a processing system 221, such as a set of one or more microprocessors, which is coupled to a wireless mobile telephony transceiver 223; the wireless mobile telephony transceiver 223 may be a wireless mobile cellular telephone transceiver which is, to at least some extent, controlled by the processing system 221. In one embodiment, the data processing system 203 may be a handheld PDA or handheld general purpose computer which includes a wireless cellular telephone. In this case, the RF circuitry needed for the wireless cellular telephone may be provided by the wireless mobile telephony transceiver 223. The data processing system 203 also includes one or more sensors 227, memory 229, I/O devices 231 and at least one additional wireless transceiver 225, each of which are coupled to the processing system 221. The processing system 221 may include a set of one or more microprocessors which are coupled to the rest of the data processing system 203 through one or more buses. The one or more sensors 227 may be located on the data processing system 203 and may be designed to detect or measure user activity or a device context as explained further below. The one or more sensors 227 may include, for example, a proximity sensor and/or an ambient light sensor and/or an accelerometer and/or other sensors described herein. The sensor data from these one or more sensors 227 is provided to the processing system 221 which may process this data or may transmit this sensor data to the peripheral for processing, as described herein, or both of the peripheral and the processing system 221 may process the sensor data. The I/O (input/output) devices 231 may include one or more of (a) a keyboard; (b) a touch input panel; (c) a cursor control device (such as, e.g., a joystick or trackpad); (d) speaker; (e) microphone; (f) buttons (such as, e.g., "send" and "end" or other buttons for a cellular telephone); (g) a display device; and (h) other known input/output devices. In one embodiment, a touch input panel may be integrated with a display device to provide both input and output capabilities on the same surface of the display device; this is described further below. These I/O devices allow a user to enter instructions or commands or data to the processing system 221 to cause the system to operate in a manner desired by the user. The memory 229 may be any combination of DRAM or flash memory or other types of memory including, for example, a magnetic hard drive, and the memory 229 may be coupled to the processing system through one or more memory controllers; the memory 229 may store computer program instructions, including a computer operation system (OS) and user application programs, such as, for example, a web browser application, an email application, a calendar program, an address book application, and other possible applications.

The memory 229 may also store user data such as, for example, address and/or contact information, calendar information (e.g. events and tasks), bookmarks/favorites (e.g. "URLs") and other user data (e.g. word processing documents, spreadsheets, presentations, etc.). The processing system 221 may retrieve and store computer program instructions and data from the memory 229 in order to allow the user to operate the data processing system 203. Moreover, the memory 229 may store music and/or other media for playback on the data processing system 203, which can allow the user to display and select music and/or other media for playback on a speaker (e.g. an earphone) or a wireless headset of a peripheral, such as peripheral 201. The wireless transceiver(s) 225 may include one or more wireless transceivers which provide wireless connectivity to other devices, such as the peripheral 201 or a wireless network (e.g. a WiFi network or other wireless local area networks (WLAN) or a wireless personal area network (WPAN), etc.). The wireless transceiver(s) 225 are coupled to the processing system 221 to provide data to the data processing system 203. In one embodiment, the wireless transceiver(s) 225 include a Bluetooth compliant transceiver to couple wirelessly the data processing system 203 to the peripheral 201 and optionally other peripherals (e.g. a wireless keyboard) and a WiFi compliant transceiver (e.g. IEEE 802.11a/g compliant transceiver) to wirelessly couple the system 203 to a wireless network and/or other devices. The peripheral 201 and the data processing system 203 may be paired together using known techniques, such as the techniques described herein, to create a Bluetooth partnership. The pairing may alternatively involve other techniques which register one device with another device to provide a secure, authenticated communication channel between the peripheral 201 and the data processing system 203.

In one embodiment, the peripheral 201 and the data processing system 203 may be capable of working together to determine a user's intent or actions or the system's context based on sensor data from at least one sensor on the peripheral 201 or the data processing system 203 or both. For example, a set of sensors, such as, for example, a proximity sensor and an ambient light sensor on the peripheral may provide data which indicate that the peripheral is not proximate to the user, while another set of sensors on the host may provide data which indicate that the host is near to the user's ear; in this situation, the peripheral and the host may exchange data, such as data from the sensors and instructions which automatically cause a change in configuration of the peripheral and/or the host in response to the sensor data. If, in this example, the peripheral is a wireless headset and the host is a wireless cellular telephone, then the peripheral may transmit its sensor data to the host which processes this sensor data along with sensor data from the host to determine that the user is holding the wireless cellular telephone against the user's ear and the headset is not close to the user, and hence the host will automatically enable the host's speaker and microphone and will transmit an instruction to the headset to cause it to disable the headset's speaker and microphone.

Figure 2A:
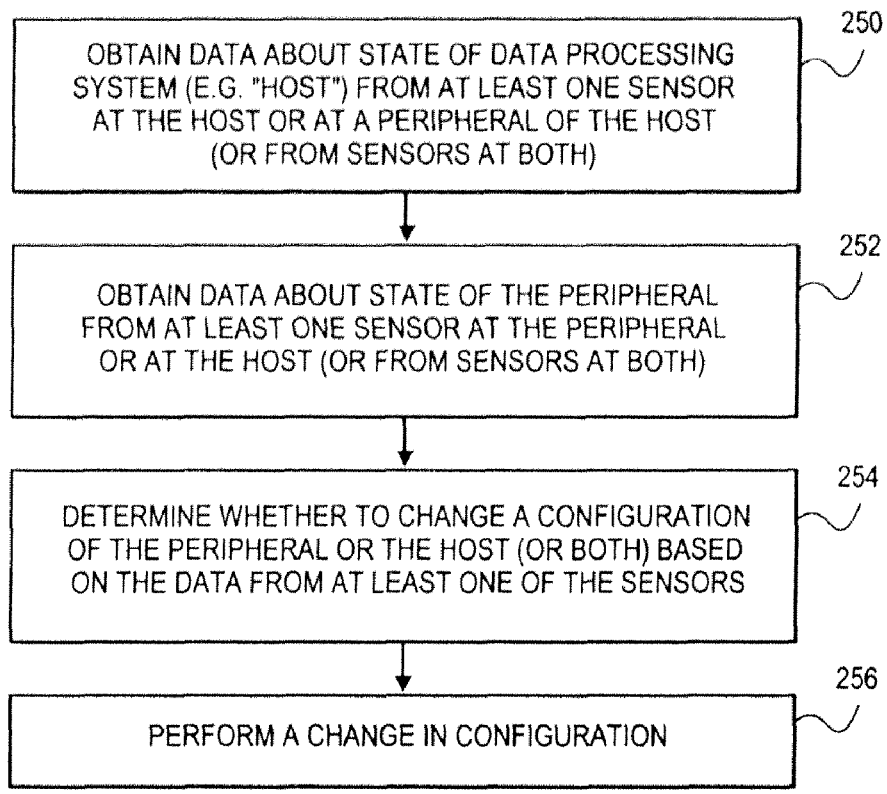
FIG. 2A is a flow chart of an embodiment of a method of the inventions described herein.

FIG. 2A shows a general example of a method according to one embodiment of the inventions. In operation 250, data about the state of the data processing system is obtained from at least one sensor which may be at the host or at the peripheral or at both of the host and the peripheral. In operation 252, data about the state of the peripheral is obtained from at least one sensor at the peripheral or at the host or from sensors at both. It will be appreciated that, in at least certain embodiments, a method may omit operation 250 or may omit operation 252 or may perform these operations in a different sequence than shown in FIG. 2A. In operation 254, a processing system determines whether to change a configuration of the peripheral or the host or both based on data from at least one of the sensors. As noted elsewhere, the host and the peripheral may exchange sensor data to perform this determination, and one of the host or the peripheral or both may perform portions of or all of operation 254. Then in operation 256, the peripheral or the host or both perform a change in configuration. This change in configuration may involve disabling certain functionality in either the host or the peripheral or both or may involve enabling certain functionality in the peripheral or the host or both. For example, the change in configuration may involve turning on or off an audio system (e.g. a speaker and microphone) or turning on or off a backlight of a display or other light source for a display, etc. It will be appreciated that the host referred to in FIG. 2A may be the data processing system 203 and the peripheral referred to in FIG. 2A may be the peripheral 201 shown in FIG. 1.

Figure 2B:
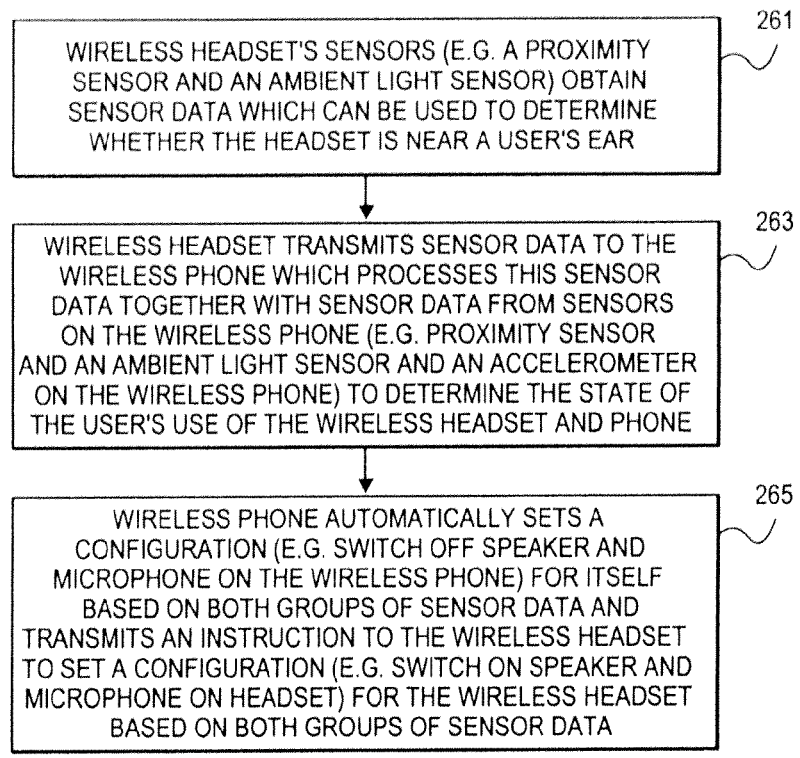
FIG. 2B is a flow chart of a specific embodiment of a method of the inventions described herein.

FIG. 2B illustrates a particular method according to one embodiment of the inventions. Operation 261 involves obtaining sensor data from sensors on the wireless headset which is a peripheral of a wireless phone, such as a wireless cellular telephone. The wireless headset referred to in FIG. 2B may be the peripheral 201 and the wireless phone referred to in FIG. 2B may be the data processing system 203. The wireless headset may include one or more sensors, such as a proximity sensor and an ambient light sensor and a sound sensor, which are used to obtain sensor data which can be used to determine whether the headset is near a user's ear. In operation 263, the wireless headset transmits sensor data obtained from its sensors to the wireless phone which processes this sensor data together with sensor data from sensors on the wireless phone. The sensors on the wireless phone may include one or more sensors such as a proximity sensor, an ambient light sensor, and an accelerometer, all on the wireless phone. The wireless headset may transmit this sensor data through a wireless personal area network (WPAN). In the example shown in FIG. 1, the wireless transceiver 207 may transmit sensor data to the data processing system which is received by the wireless transceiver 225. In one embodiment, the wireless transceiver 207 may be a Bluetooth compliant transceiver and the wireless transceiver 225 may also be a Bluetooth compliant transceiver. The sensor data from the wireless headset and the sensor data from the wireless phone are processed together to determine the state of the user's use of the wireless headset and phone. In response to processing this sensor data, the wireless phone in operation 265 automatically selects a configuration (such as, for example, switching off the speaker and microphone on the wireless phone and switching on the speaker and microphone of the wireless headset) for itself based on both groups of sensor data and transmits an instruction to the wireless headset to select a configuration, such as switching on the speaker and microphone on the headset. This selection of a configuration occurs in response to processing of sensor data from sensors on both the wireless headset and the wireless phone. It will be appreciated that there are numerous alternative implementations of the method shown in FIG. 2B. For example, the sensor data from the wireless phone may be transmitted to the wireless headset, which processes the sensor data from the wireless phone and the sensor data from the wireless headset and determines how to set configurations on both the phone and the wireless headset and transmits an instruction to the wireless phone to cause the wireless phone to change its configuration.

FIG. 3A shows an example of how sensor data from a headset peripheral and sensor data from a data processing system which is a phone may cause certain actions for both the phone and the headset. The column labeled "Headset Proximity" shows a characterization of proximity sensor data obtained from a proximity sensor on the headset. The column labeled "Phone Proximity" shows a characterization in three different instances of proximity sensor data from a proximity sensor on the phone. The column labeled "Enable Audio On" shows the action taken automatically by both the headset and the phone in response to the three different instances of sensor data. Instance 275 illustrates a case where the headset is far from the user and the phone is close to the user. This may occur, for example, when the headset is placed on a table and the phone is in the user's hand. In this instance, the combined sensor data, optionally with other sensor data, is analyzed to determine that the audio system on the headset should be disabled while the audio system on the phone should be enabled, as shown in instance 275 of FIG. 3A. In the case of the instance 277, sensor data from the proximity sensor on the headset indicates that the headset is close to the user, while proximity sensor data from a proximity sensor on the phone indicates that the phone is far from the user. In this case the system, which includes the headset and the phone, enables the audio system on the headset while disabling the audio system on the phone. In instance 279, sensor data from proximity sensors on the headset and the phone indicate that both the headset and the phone are close to the user and in this case, the default action which may occur automatically is to enable the audio on the headset while disabling the audio on the phone. Instance 279 may represent a situation in which the user is holding the phone and the headset is being worn by the user on the user's ear.

It will be appreciated that in one embodiment, if both devices detect the user, then they attempt to decide which should take priority. Other sensors may be used in performing this operation. For example, a sound sensor may reveal that the user is talking into the wireless headset and not talking into the phone based upon the sound intensity from the two devices. Accelerometers may also be used to provide motion and orientation data for one or both of the devices in order to assist in deciding how to configure both the peripheral and the data processing system in response to context or user actions. For example, if both devices are on a table and one is picked up and the other is not, then by using the data from the accelerometers indicating which one was not picked up, the system may cause the device not picked up to be disabled. For example, if the phone is left on the table and the wireless headset is picked up, then the audio system of the phone is disabled and the audio system of the wireless headset is enabled for a phone call or other communication. In certain embodiments, both audio systems of the peripheral and the data processing system may be enabled until the peripheral and the data processing system can decide which of the two devices to disable.

Figure 3B:
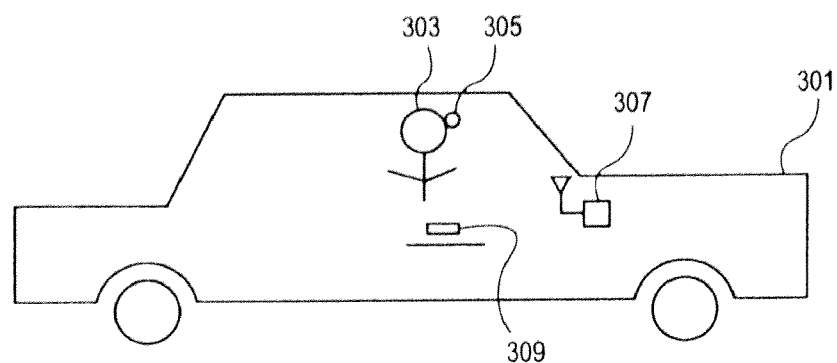
FIG. 3B shows a view of a user in a motor vehicle with a peripheral (e.g. a wireless headset), a data processing system (e.g. a wireless mobile cellular telephone) and a car adapter; in this view, the user is wearing the peripheral.
Figure 3C:
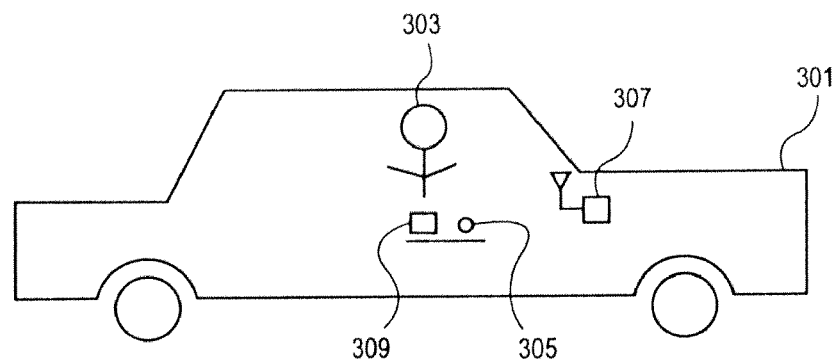
FIG. 3C shows another view of the user of FIG. 3B in the motor vehicle; in this view, the user is not wearing the peripheral and is not holding the data processing system.

FIGS. 3B and 3C show examples of how a data processing system, such as a wireless cellular telephone, and a peripheral, such as a wireless headset which operates with the data processing system, may also operate with another data processing system, such as an adapter device fixed to a motor vehicle, such as an automobile. In the examples shown in FIGS. 3B and 3C, the user 303 is sitting in a car 301 which includes a telephone car adapter 307 which is designed to interoperate with the data processing device 309 which may be a wireless cellular telephone. The data processing system 203 shown in FIG. 1 may be the data processing system 309. The peripheral 305 is shown as being worn on the user's ear in the case of FIG. 3B, and in the case of FIG. 3C, the wireless headset 305 is shown on the car's seat next to the user 303. The peripheral 201 shown in FIG. 1 may be the peripheral 305, which may be a wireless headset. The telephone car adapter 307 wirelessly communicates with the data processing system 309 such that the audio of a phone call may be routed through the car's speakers and a microphone in the car rather than a microphone or speaker on the wireless headset or on the wireless phone 309. The telephone car adapter 307 may also enable the user to play back media from the data processing system 309 through the car's speakers. For example, if the data processing system 309 includes a media player for playing songs, the telephone car adapter 307 may be configured such that audio from the songs is played back through the car's speakers by transmitting the audio from the data processing system 309 to the telephone car adapter 307 which in turn drives the car's speakers. The user may set up the telephone car adapter 307 so that it can be automatically configured to route audio to the car's speakers in response to sensor data from sensors on one or both of the wireless headset 305 and the wireless telephone 309. In the case of FIG. 3B, proximity sensors or other sensors on the wireless headset 305 indicate that the user 303 is wearing the wireless headset. In this case, the sensor data from the wireless headset may be processed in the wireless headset or in the wireless telephone 309, and the result of this processing indicates that the audio system of the wireless headset should be enabled while disabling the audio system on the wireless telephone 309 and disabling the routing of audio to the car's speakers. In the case of FIG. 3C, sensors on one or both of the wireless headset 305 and the wireless telephone 309 determine that neither device is close to the user and in response causes audio to be routed to the telephone car adapter 307 which in turn drives the car's speakers and also enables the microphone of the car so that the user can use the audio system of the car automatically in response to the sensors on one or both of the wireless headset 305 and the wireless telephone 309, determining that neither device is close to the user.

At least certain embodiments of the present inventions include one or more sensors on one or both of a peripheral or a data processing system to monitor user activity or device context. At least certain embodiments of the present inventions also may include automatically changing a state of the peripheral and/or the data processing system based on user activity or the context of the peripheral and/or the data processing system. Such automatic changing may include, for example, automatically changing an audio setting or activating or deactivating a backlight of a display device of the portable device or setting an input device of the portable device to a particular state, based on certain predetermined user activities.

At least certain embodiments of the inventions may include a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple Computer, Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s). Examples of a portable media player are described in published U.S. patent application numbers 2003/0095096 and 2004/0224638, both of which are incorporated herein by reference.

Embodiments of the inventions described herein may be part of other types of data processing systems, such as, for example, entertainment systems or personal digital assistants (PDAs), or general purpose computer systems, or special purpose computer systems, or an embedded device within another device, or cellular telephones which do not include media players, or devices which combine aspects or functions of these devices (e.g., a media player, such as an iPod®, combined with a PDA, an entertainment system, and a cellular telephone in one portable device).

Figure 4A:
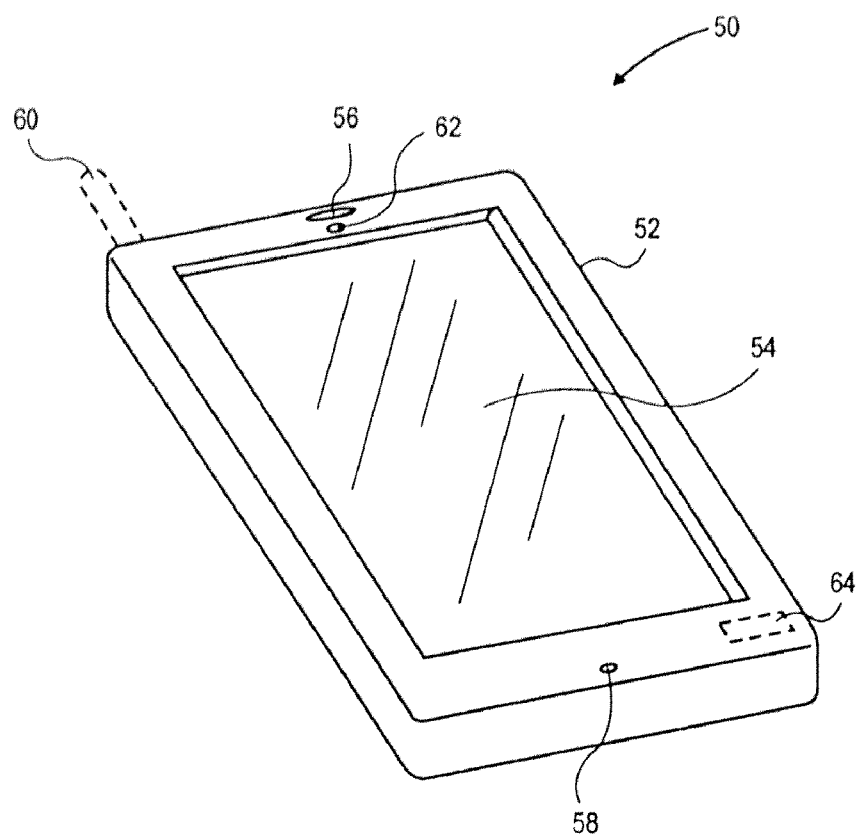
FIG. 4A is a perspective view of a portable data processing system in accordance with one embodiment of the inventions described herein.
Figure 4B:
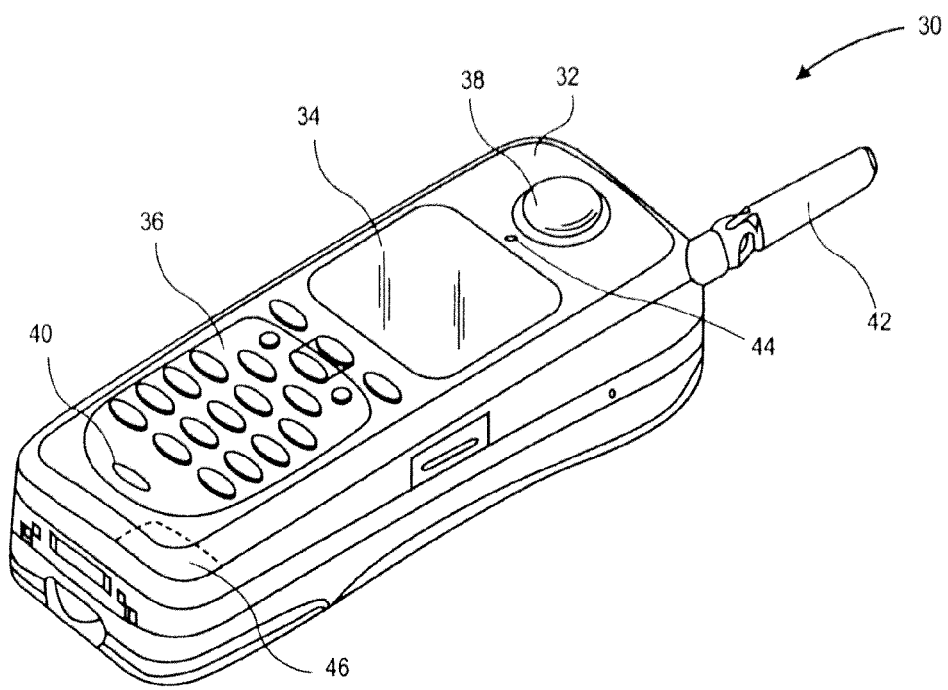
FIG. 4B is a perspective view of a portable data processing system in accordance with one embodiment of the inventions described herein.

FIG. 4B illustrates a data processing system according to one embodiment of the invention; this data processing system of FIG. 4B may be implemented as an embodiment of the data processing system 203 shown in FIG. 1, and may operate with a peripheral in a manner which is shown in FIG. 2A and is described relative to FIG. 2A. FIG. 4B shows a wireless device in a telephone configuration having a "candy-bar" style. In FIG. 4B, the wireless device 30 may include a housing 32, a display device 34, an input device 36 which may be an alphanumeric keypad, a speaker 38, a microphone 40 and an antenna 42. The wireless device 30 also may include a proximity sensor 44 and an accelerometer 46. It will be appreciated that the embodiment of FIG. 4B may use more or fewer sensors and may have a different form factor from the form factor shown in FIG. 4B.

The display device 34 is shown positioned at an upper portion of the housing 32, and the input device 36 is shown positioned at a lower portion of the housing 32. The antenna 42 is shown extending from the housing 32 at an upper portion of the housing 32. The speaker 38 is also shown at an upper portion of the housing 32 above the display device 34. The microphone 40 is shown at a lower portion of the housing 32, below the input device 36. It will be appreciated that the speaker 38 and microphone 40 can be positioned at any location on the housing, but are typically positioned in accordance with a user's ear and mouth, respectively. The proximity sensor 44 is shown at or near the speaker 38 and at least partially within the housing 32. The accelerometer 46 is shown at a lower portion of the housing 32 and within the housing 32. It will be appreciated that the particular locations of the above-described features may vary in alternative embodiments.

The display device 34 may be, for example, a liquid crystal display (LCD) which does not include the ability to accept inputs or a touch input screen which also includes an LCD. The input device 36 may include, for example, buttons, switches, dials, sliders, keys or keypad, navigation pad, touch pad, touch screen, and the like.

Any well-known speaker, microphone and antenna can be used for speaker 38, microphone 40 and antenna 42, respectively.

Figure 6:
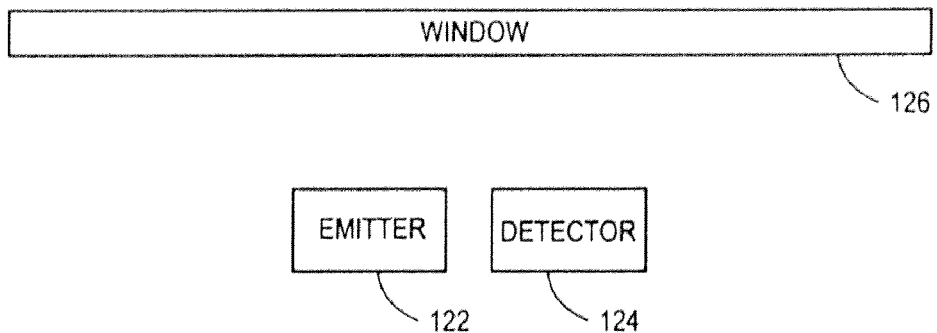
FIG. 6 is a schematic side view of a proximity sensor in accordance with one embodiment of the inventions described herein.

The proximity sensor 44 may detect location (e.g. distance from the wireless device 30), direction, speed, etc. of objects relative to the wireless device 30. A location of an object relative to the wireless device can be represented as a distance in at least certain embodiments. The proximity sensor may generate location or movement data or both, which may be used to determine the location of objects relative to the portable device 30 and/or proximity sensor 44. An example of a proximity sensor is shown in FIG. 6.

In addition, a processing device (not shown) is coupled to the proximity sensor(s) 44. The processing device may be used to determine the location of objects relative to the portable device 30 or proximity sensor 44 or both based on the location and/or movement data provided by the proximity sensor 44. The proximity sensor may continuously or periodically monitor the object location. The proximity sensor may also be able to determine the type of object it is detecting.

Additional information about proximity sensors can be found in U.S. patent application Ser. No. 11/241,839, titled "PROXIMITY DETECTOR IN HANDHELD DEVICE," and U.S. patent application Ser. No. 11/240,788, titled "PROXIMITY DETECTOR IN HANDHELD DEVICE;" U.S. patent application Ser. No. 11/165,958, titled "METHODS AND APPARATUS FOR REMOTELY DETECTING PRESENCE," filed Jun. 23, 2005; and U.S. Pat. No. 6,583,676, titled "PROXIMITY/TOUCH DETECTOR AND CALIBRATION CIRCUIT," issued Jun. 24, 2003, all of which are incorporated herein by reference in their entirety.

According to one embodiment, the accelerometer 46 is able to detect a movement including an acceleration or de-acceleration of the wireless device. The accelerometer 46 may generate movement data for multiple dimensions, which may be used to determine a direction of movement of the wireless device. For example, the accelerometer 46 may generate X, Y and Z axis acceleration information when the accelerometer 46 detects that the portable device is moved. In one embodiment, the accelerometer 46 may be implemented as described in U.S. Pat. No. 6,520,013, which is incorporated herein by reference in its entirety. Alternatively, the accelerometer 46 may be a KGF01 accelerometer from Kionix or an ADXL311 accelerometer from Analog Devices or other accelerometers which are known in the art.

In addition, a processing device (not shown) is coupled to the accelerometer(s) 46. The processing device may be used to calculate a direction of movement, also referred to as a movement vector of the wireless device 30. The movement vector may be determined according to one or more predetermined formulas based on the movement data (e.g., movement in X, Y and Z) provided by accelerometer 46. The processing device may be integrated with the accelerometer 46 or integrated with other components, such as, for example, a chipset of a microprocessor, of the portable device.

The accelerometer 46 may continuously or periodically monitor the movement of the portable device. As a result, an orientation of the portable device prior to the movement and after the movement may be determined based on the movement data provided by the accelerometer attached to the portable device.

Additional information about accelerometers can be found in co-pending U.S. patent application Ser. No. 10/986,730, filed Nov. 12, 2004, which is hereby incorporated herein by reference in its entirety.

The data acquired from the proximity sensor 44 and the accelerometer 46 can be combined together, or used alone, to gather information about the user's activities. The data from the proximity sensor 44, the accelerometer 46 or both can be used, for example, to activate/deactivate a display backlight, initiate commands, make selections, control scrolling or other movement in a display, control input device settings, or to make other changes to one or more settings of the device.

FIG. 4A shows a portable device 50 in accordance with one embodiment of the invention. The portable device 50 may include a housing 52, a display/input device 54, a speaker 56, a microphone 58 and an optional antenna 60 (which may be visible on the exterior of the housing or may be concealed within the housing). The portable device 50 also may include a proximity sensor 62 and an accelerometer 64 and optionally other sensors (e.g. an ambient light sensor). The portable device 50 may be a cellular telephone or a device which is an integrated PDA and a cellular telephone or a device which is an integrated media player and a cellular telephone or a device which is both an entertainment system (e.g. for playing games) and a cellular telephone, or the portable device 50 may be other types of devices described herein. In one particular embodiment, the portable device 50 may include a cellular telephone and a media player and a general purpose computer, all contained within the housing 52. The portable device 50 may be implemented as an embodiment of the data processing system 203 shown in FIG. 1 and may operate with a peripheral in a manner which is shown in FIG. 2A and is described relative to FIG. 2A. The portable device 50 may have a form factor which is small enough that it fits within the hand of a normal adult and is light enough that it can be carried in one hand by an adult. It will be appreciated that the term "portable" means the device can be easily held in an adult user's hands (one or both); for example, a laptop computer and an iPod are portable devices.

In one embodiment, the display/input device 54 may include a multi-point touch input screen in addition to being a display, such as an LCD. In one embodiment, the multi-point touch screen is a capacitive sensing medium configured to detect multiple touches (e.g., blobs on the display from a user's face or multiple fingers concurrently touching or nearly touching the display) or near touches (e.g., blobs on the display) that occur at the same time and at distinct locations in the plane of the touch panel and to produce distinct signals representative of the location of the touches on the plane of the touch panel for each of the multiple touches. Additional information about multi-point input touch screens can be found in co-pending U.S. patent application Ser. No. 10/840,862, filed May 6, 2004 (see published U.S. patent application 20060097991), which is incorporated herein by reference in its entirety. A multi-point input touch screen may also be referred to as a multi-touch input panel.

A processing device (not shown) may be coupled to the display/input device 54. The processing device may be used to calculate touches on the touch panel. The display/input device 54 can use the detected touch (e.g., blob or blobs from a user's face) data to, for example, identify the location of certain objects and to also identify the type of object touching (or nearly touching) the display/input device 54.

The data acquired from the proximity sensor 62 and the display/input device 54 can be combined to gather information about the user's activities as described herein. The data from the proximity sensor 62 and the display/input device 54 can be used to change one or more settings of the portable device 50, such as, for example, change an illumination setting of the display/input device 54.

In one embodiment, as shown in FIG. 4A, the display/input device 54 occupies a large portion of one surface (e.g. the top surface) of the housing 52 of the portable device 50. In one embodiment, the display/input device 54 consumes substantially the entire front surface of the portable device 50. In another embodiment, the display/input device 54 consumes, for example, at least 75% of a front surface of the housing 52 of the portable device 50. In alternative embodiments, the portable device 50 may include a display which does not have input capabilities, but the display still occupies a large portion of one surface of the portable device 50. In this case, the portable device 50 may include other types of input devices such as a QWERTY keyboard or other types of keyboard which slide out or swing out from a portion of the portable device 50.

Figure 4C:
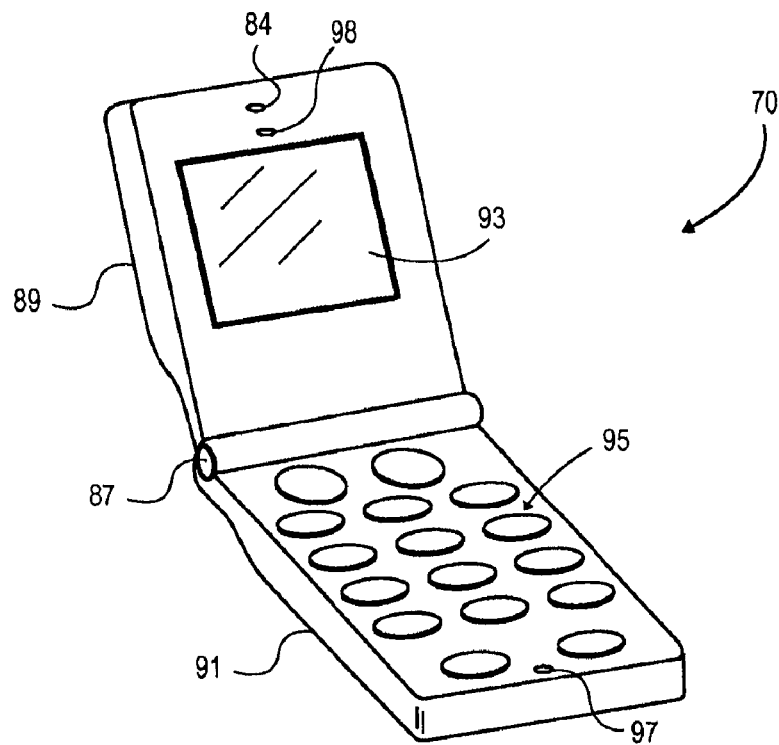
FIG. 4C is a perspective view of a portable data processing system in a first configuration (e.g. in an opened configuration) in accordance with one embodiment of the inventions described herein.
Figure 4D:
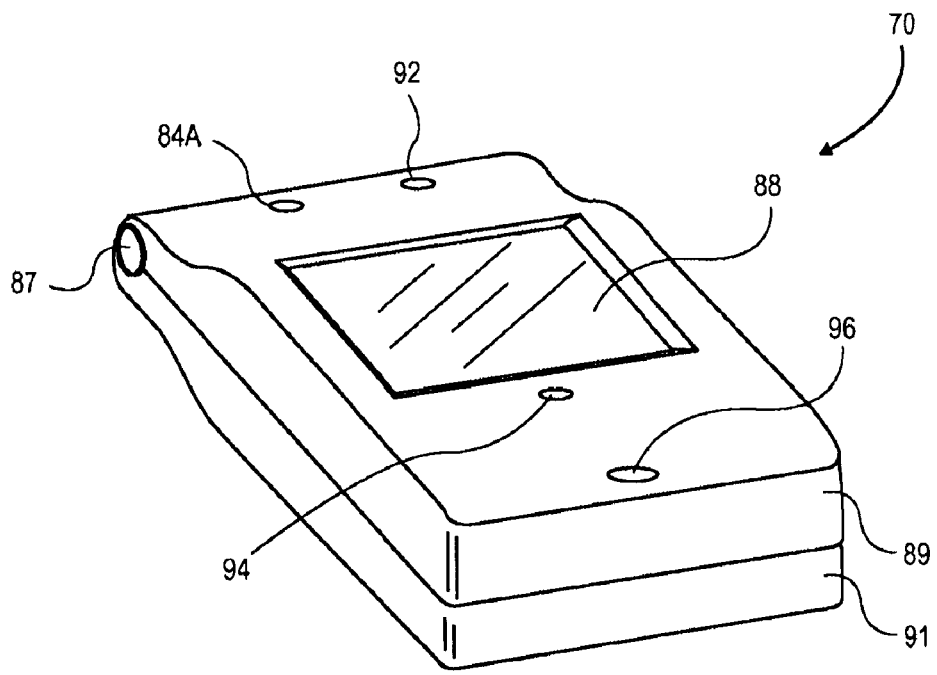
FIG. 4D is a perspective view of a portable data processing system in a second configuration (e.g. in a closed configuration) in accordance with one embodiment of the inventions described herein.

FIGS. 4C and 4D illustrate a portable device 70 according to one embodiment of the invention. The portable device 70 may be implemented as an embodiment of the data processing system 203 shown in FIG. 1 and may operate with a peripheral in a manner which is shown in FIG. 2A and is described relative to FIG. 2A. The portable device 70 may be a cellular telephone which includes a hinge 87 that couples a display housing 89 to a keypad housing 91. The hinge 87 allows a user to open and close the cellular telephone so that it can be placed in at least one of two different configurations shown in FIGS. 4C and 4D. In one particular embodiment, the hinge 87 may rotatably couple the display housing to the keypad housing. In particular, a user can open the cellular telephone to place it in the open configuration shown in FIG. 4C and can close the cellular telephone to place it in the closed configuration shown in FIG. 4D. The keypad housing 91 may include a keypad 95 which receives inputs (e.g. telephone number inputs or other alphanumeric inputs) from a user and a microphone 97 which receives voice input from the user. The display housing 89 may include, on its interior surface, a display 93 (e.g. an LCD) and a speaker 98 and a proximity sensor 84; on its exterior surface, the display housing 89 may include a speaker 96, a temperature sensor 94, a display 88 (e.g. another LCD), an ambient light sensor 92, and a proximity sensor 84A. Hence, in this embodiment, the display housing 89 may include a first proximity sensor on its interior surface and a second proximity sensor on its exterior surface. The first proximity sensor may be used to detect a user's head or ear being within a certain distance of the first proximity sensor and to cause an illumination setting of displays 93 and 88 to be changed automatically in response to this detecting (e.g. the illumination for both displays are turned off or otherwise set in a reduced power state). Data from the second proximity sensor, along with data from the ambient light sensor 92 and data from the temperature sensor 94, may be used to detect that the cellular telephone has been placed into the user's pocket.

In at least certain embodiments, the portable device 70 may contain components which provide one or more of the functions of a wireless communication device such as a cellular telephone, a media player, an entertainment system, a PDA, or other types of devices described herein. In one implementation of an embodiment, the portable device 70 may be a cellular telephone integrated with a media player which plays MP3 files, such as MP3 music files.

Figure 5:
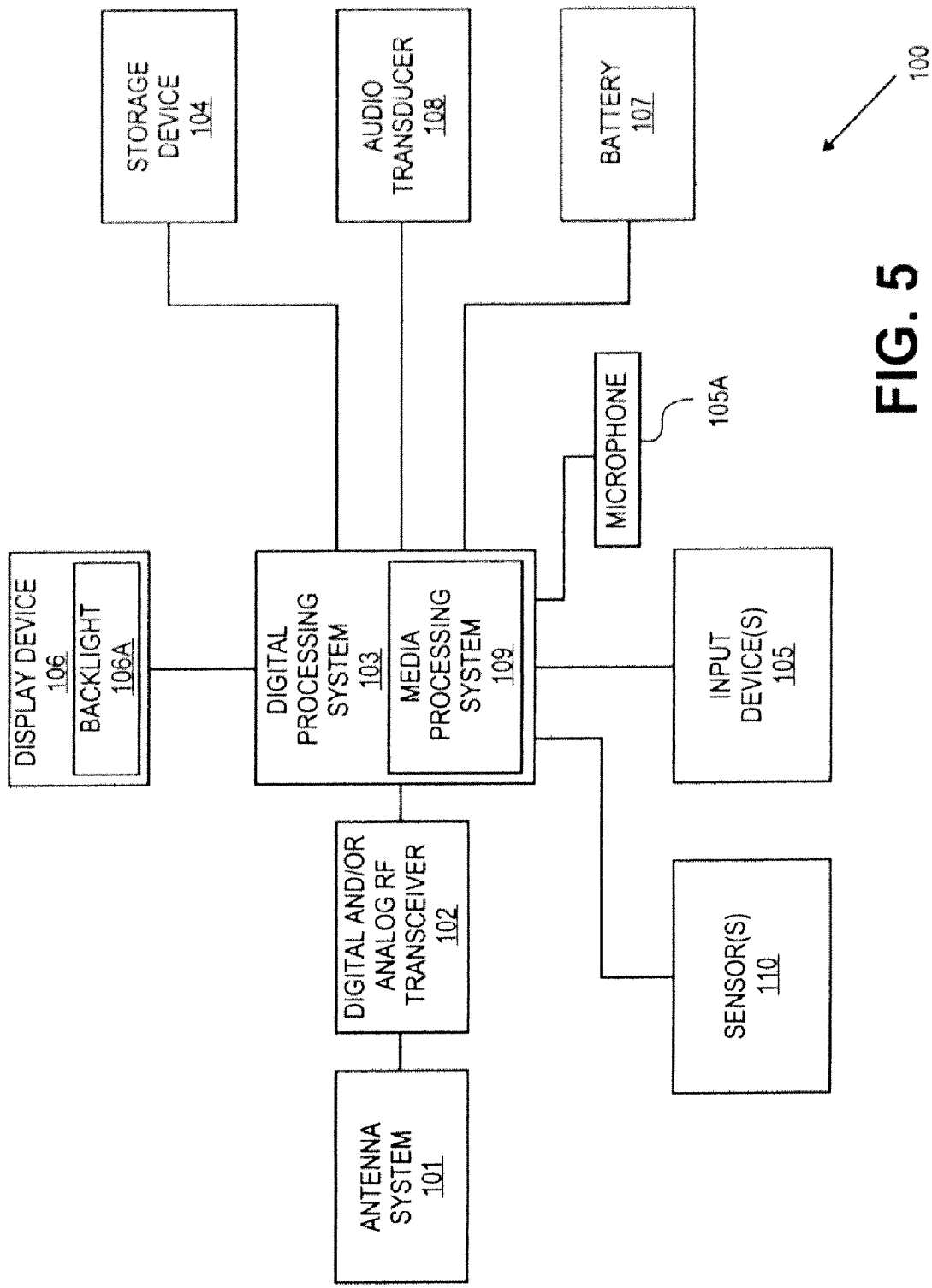
FIG. 5 is a block diagram of a data processing system in which embodiments of the inventions can be implemented.

Each of the devices shown in FIGS. 4A, 4B, 4C and 4D may be a wireless communication device, such as a wireless cellular telephone, and may include a plurality of components which provide a capability for wireless communication. FIG. 5 shows an embodiment of a wireless device 100 which includes the capability for wireless communication. The wireless device 100 may be included in any one of the devices shown in FIGS. 4A, 4B, 4C and 4D, although alternative embodiments of those devices of FIGS. 4A, 4B, 4C and 4D may include more or fewer components than the wireless device 100. Furthermore, all or portions of wireless device 100 may be implemented as part of data processing system 203, and wireless device 100 may operate with a peripheral in a manner which is described herein relative to FIG. 2A.

Wireless device 100 may include an antenna system 101. Wireless device 100 may also include a digital and/or analog radio frequency (RF) transceiver 102, coupled to the antenna system 101, to transmit and/or receive voice, digital data and/or media signals through antenna system 101.

Wireless device 100 may also include a digital processing system 103 to control the digital RF transceiver and to manage the voice, digital data and/or media signals. Digital processing system 103 may be a general purpose processing device, such as a microprocessor or controller for example. Digital processing system 103 may also be a special purpose processing device, such as an ASIC (application specific integrated circuit), FPGA (field-programmable gate array) or DSP (digital signal processor). Digital processing system 103 may also include other devices, as are known in the art, to interface with other components of wireless device 100. For example, digital processing system 103 may include analog-to-digital and digital-to-analog converters to interface with other components of wireless device 100. Digital processing system 103 may include a media processing system 109, which may also include a general purpose or special purpose processing device to manage media, such as files of audio data.

Wireless device 100 may also include a storage device 104, coupled to the digital processing system, to store data and/or operating programs for the wireless device 100. Storage device 104 may be, for example, any type of solid-state or magnetic memory device.

Wireless device 100 may also include one or more input devices 105, coupled to the digital processing system 103, to accept user inputs (e.g., telephone numbers, names, addresses, media selections, etc.) Input device 105 may be, for example, one or more of a keypad, a touchpad, a touch screen, a pointing device in combination with a display device or similar input device.

Wireless device 100 may also include at least one display device 106, coupled to the digital processing system 103, to display information such as messages, telephone call information, contact information, pictures, movies and/or titles or other indicators of media being selected via the input device 105. Display device 106 may be, for example, an LCD display device. In one embodiment, display device 106 and input device 105 may be integrated together in the same device (e.g., a touch screen LCD such as a multi-touch input panel which is integrated with a display device, such as an LCD display device). Examples of a touch input panel and a display integrated together are shown in U.S. published application No. 20060097991. The display device 106 may include a backlight 106a to illuminate the display device 106 under certain circumstances. It will be appreciated that the wireless device 100 may include multiple displays.

Wireless device 100 may also include a battery 107 to supply operating power to components of the system including digital RF transceiver 102, digital processing system 103, storage device 104, input device 105, microphone 105A, audio transducer 108, media processing system 109, sensor(s) 110, and display device 106. Battery 107 may be, for example, a rechargeable or non-rechargeable lithium or nickel metal hydride battery.

Wireless device 100 may also include audio transducers 108, which may include one or more speakers, and at least one microphone 105A.

Wireless device 100 may also include one or more sensors 110 coupled to the digital processing system 103. The sensor(s) 110 may include, for example, one or more of a proximity sensor, accelerometer, touch input panel, ambient light sensor, ambient noise sensor, temperature sensor, gyroscope, a hinge detector, a position determination device, an orientation determination device, a motion sensor, a sound sensor, a radio frequency electromagnetic wave sensor, and other types of sensors and combinations thereof. One or more of such sensors may also be included on a peripheral which is configured to operate with (e.g. exchange data with) the data processing system. Based on the data acquired by the sensor(s) 110 and sensor(s) on a peripheral, various responses may be performed automatically by the data processing system or the peripheral or both, such as, for example, activating or deactivating the backlight 106a, changing a setting of the input device 105 (e.g. switching between processing or not processing, as an intentional user input, any input data from an input device), and other responses and combinations thereof.

In one embodiment, digital RF transceiver 102, digital processing system 103 and/or storage device 104 may include one or more integrated circuits disposed on a printed circuit board (PCB).

Figure 7:
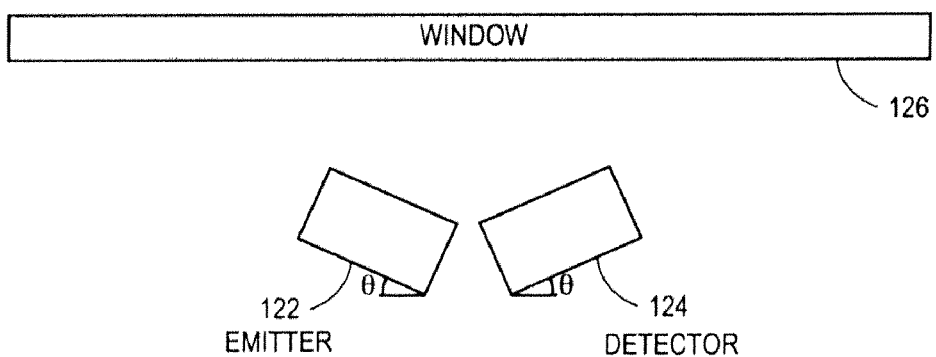
FIG. 7 is a schematic side view of an alternative proximity sensor in accordance with one embodiment of the inventions described herein.

FIGS. 6 and 7 illustrate exemplary proximity sensors in accordance with embodiments of the invention. It will be appreciated that, in alternative embodiments, other types of proximity sensors, such as capacitive sensors or sonar-like sensors, may be used rather than the proximity sensors shown in FIGS. 6 and 7. In FIG. 6, the proximity sensor 120 includes an emitter 122, a detector 124, and a window 126. The emitter 122 generates light in the infrared (IR) bands, and may be, for example, a Light Emitting Diode (LED). The detector 124 is configured to detect changes in light intensity and may be, for example, a phototransistor. The window 126 may be formed from translucent or semi-translucent material. In one embodiment, the window 126 is an acoustic mesh, such as, for example, a mesh typically found with a microphone or speaker of the portable device. In other embodiments, the window 126 may be MicroPerf, IR transparent strands wound in a mesh, or a cold mirror.

During operation, the light from the emitter 122 hits an object 128 and scatters when the object is present above the window 126. The light from the emitter may be emitted in square wave pulses which have a known frequency, thereby allowing the detector 124 to distinguish between ambient light and light from emitter 122 which is reflected by an object, such as the user's head or ear or a material in a user's pocket, back to the detector 124. At least a portion of the scattered light is reflected towards the detector 124. The increase in light intensity is detected by the detector 124, and this is interpreted by a processing system (not shown in FIG. 6) to mean an object is present within a short distance of the detector 124. If no object is present or the object is beyond a certain distance from the detector 124, an insufficient or smaller amount of the emitted light is reflected back towards the detector 124, and this is interpreted by the processing system (not shown in FIG. 6) to mean that an object is not present or is at a relatively large distance. In each case, the proximity sensor is measuring the intensity of reflected light which is related to the distance between the object which reflects the light and detector 124.

In one embodiment, the emitter 122 and detector 124 are disposed within the housing of a portable device, such as those described above with reference to FIGS. 4A-4D.

In FIG. 7, the emitter 122 and detector 124 of the proximity sensor are angled inward towards one another to improve detection of the reflected light, but the proximity sensor of FIG. 7 otherwise operates in a manner similar to the proximity sensor of FIG. 6.

It will be appreciated that at least some of the sensors which are used with embodiments of the inventions may determine or provide data which represents an analog value. In other words, the data represents a value which can be any one of a set of possible values which can vary continuously or substantially continuously, rather than being discrete values which have quantum, discrete jumps from one value to the next value. Further, the value represented by the data may not be predetermined. For example, in the case of a distance measured by a proximity sensor, the distance is not predetermined, unlike values of keys on a keypad which represent a predetermined value. For example, a proximity sensor may determine or provide data that represents a distance which can vary continuously or nearly continuously in an analog fashion; in the case of such a proximity sensor, the distance may correspond to the intensity of reflected light which originated from the emitter of the proximity sensor. A temperature sensor may determine or provide data that represents a temperature, which is an analog value. A light sensor, such as an ambient light sensor, may determine or provide data that represents a light intensity which is an analog value. A motion sensor, such as an accelerometer, may determine or provide data which represents a measurement of motion (e.g. velocity or acceleration or both). A gyroscope may determine or provide data which represents a measurement of orientation (e.g. amount of pitch or yaw or roll). A sound sensor may determine or provide data which represents a measurement of sound intensity. For other types of sensors, the data determined or provided by the sensor may represent an analog value.

Figure 8:
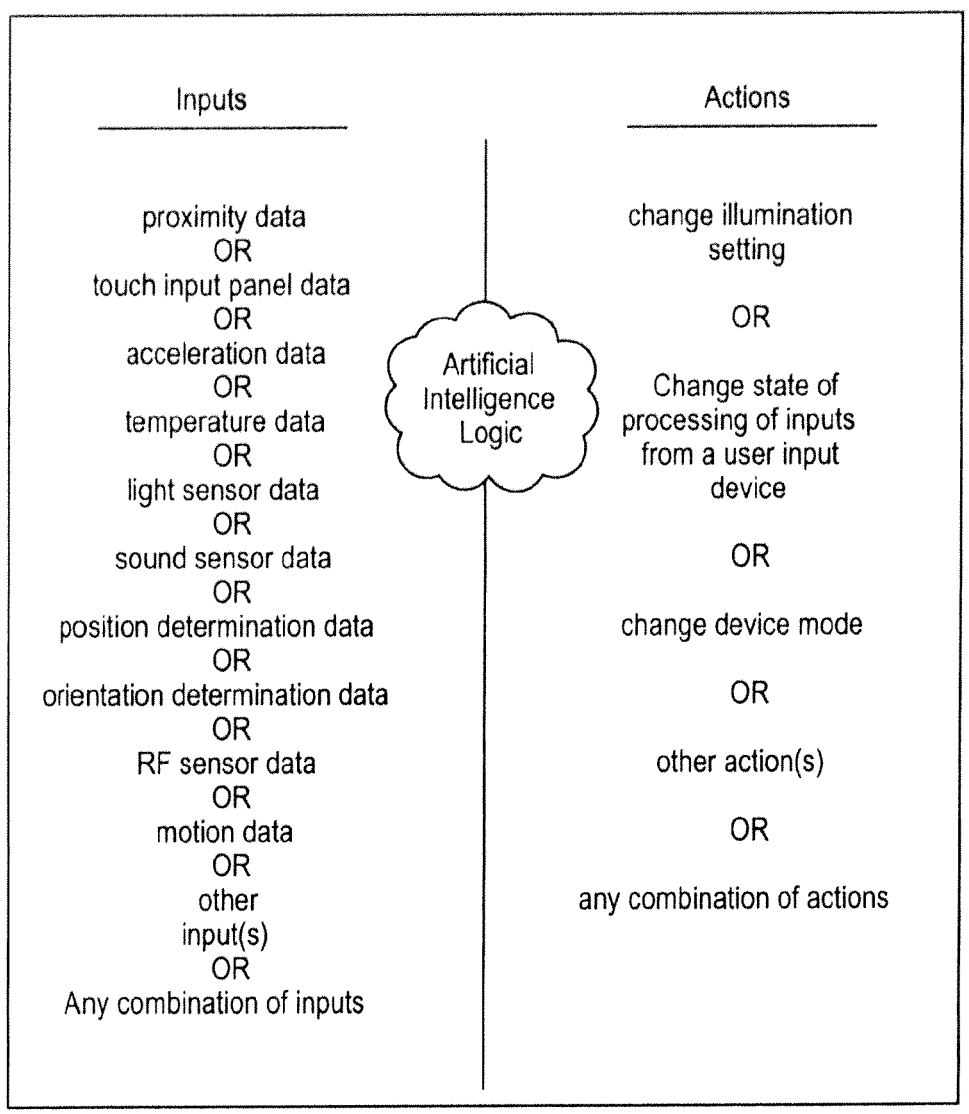
FIG. 8 is a block diagram showing how data from sensors are used as inputs to a process, such as an artificial intelligence process (or other logical process), which in turn produce actions, such as changing one or more configuration settings of a device.

FIG. 8 shows a diagram of various inputs from sensors that can be used and actions that can be performed in accordance with at least one embodiment of the invention. Any one of the devices described herein, including the devices shown in FIGS. 4A-4D and the peripheral 201 and the data processing system 203, may operate in accordance with the use of artificial intelligence as represented by FIG. 8. One or more inputs on the left side of FIG. 8 are received from various sensors of a device and are input into the artificial intelligence (AI) logic. One or more actions on the right side of FIG. 8 may be implemented by the AI logic automatically in response to any combination of the inputs. In one implementation of this embodiment, the actions are implemented substantially immediately after the data is sensed by one or more sensors.

Exemplary inputs of FIG. 8 may include, for example, proximity data, proximity data and blob detect data (e.g., from a multipoint touch input screen), proximity data and accelerometer data, accelerometer data and blob detect data, proximity data and temperature data, proximity data and ambient light data, and numerous other possible combinations.

Exemplary actions of FIG. 8 may include, for example, enabling the audio system of one of a peripheral and a data processing system while disabling the other's audio system, turning off the backlight of the portable device's display, suppressing the user's ability to input at the user interface (e.g., locking the input device), changing the telephone's mode, and the like. It will be appreciated that combinations of the above actions may also be implemented by the AI logic. For example, the AI logic may both turn off the display's backlight and suppress the user's ability to input at the user interface.

AI logic of FIG. 8 performs an AI (artificial intelligence) process. In certain embodiments, the AI process may be performed without a specific, intentional user input or without user inputs having predetermined data associated therewith (e.g., key inputs). The artificial intelligence process performed by the AI logic of FIG. 8 may use a variety of traditional AI logic processing, including pattern recognition and/ or interpretation of data. For example, the AI logic may receive data from one or more sensors and compare the data to one or more threshold values and, based on those comparisons, determine how to interpret the data. In one embodiment, a threshold value may represent a distance which is compared to a value derived from a light intensity measurement in a proximity sensor. A light intensity measurement which represents a distance larger than the threshold value indicates that the object (which reflected the emitter's light) is not near, and a light intensity measurement which represents a distance smaller than the threshold value indicates that the object is near. Further, the input data may be subject to at least two interpretations (e.g. the data from a proximity sensor indicates that the user's head is near to the sensor, so turn off the back light, or the data from the proximity sensor indicates the user's head is not near, so leave the backlight under the control of a display timer), and the AI process attempts to select from the at least two interpretations to pick an interpretation that predicts a user activity. In response to the interpretation (e.g. the selection of one interpretation), the AI logic causes an action to be performed as indicated in FIG. 8, wherein the action may modify one or more settings of the device. In at least certain embodiments, the AI logic may perform an AI process which interprets the data from one or more sensors (which interpretation requires the AI process to select between at least two possible interpretations) and which selects an action (e.g. modifying a setting of the device) based on both the interpretation of the sensor data and the current state of the device (e.g. whether the user is currently communicating through the telephone in the device).

In certain embodiments, the AI process may perform traditional methods of pattern recognition on the sensor data. For example, the rate of change of the distance between the device and the user's ear may have a pattern (e.g. revealing a deceleration as the user moves the device closer to their ear), and this pattern in the rate of change of distance may be detected by a pattern matching algorithm. The phrase "artificial intelligence" is used throughout to mean that a conclusion (whether explicit or implicit) can be drawn from data available from one or more sensors about a mode of usage by the user of the device. This conclusion may or may not be expressed in the device (e.g., "the user is talking on the phone") but it will be mapped to specific actions or settings for the device that would be appropriate if the user was using the device in that way. For example, a telephone may be pre-programmed such that whenever it detects (1) a voice being spoken into the microphone, (2) that the phone is connected to a network, and (3) the proximity sensor is active, then the screen backlight will be dimmed. Such pre-programming may involve simple logic (e.g. simple combinatorial logic), but would nonetheless be within the scope of artificial intelligence as used herein. While learning, statistical analysis, iteration, and other complex aspects of AI can be used with the present invention, they are not required for the basic artificial intelligence contemplated. Likewise, the word "analyze" does not imply sophisticated statistical or other analysis, but may involve observation of only a single threshold or datum.

The AI processing, in at least certain embodiments, may be performed by a processor or processing system, such as digital processing system 103, which is coupled to the one or more sensors that provide the data which form the inputs to the AI process.

In at least certain embodiments, the device, which operates according to any of the methods described herein, may have at least one input device (e.g. a keypad or keyboard or touch input panel) which is designed to receive intentional user inputs (e.g. which specify a specific user entry) in addition to one or more sensors which are distinct and separate from the at least one input device and which sensors are not designed to receive intentional user inputs. In fact, a user may not even be aware of the presence of the one or more sensors on the device.

Figure 9A:
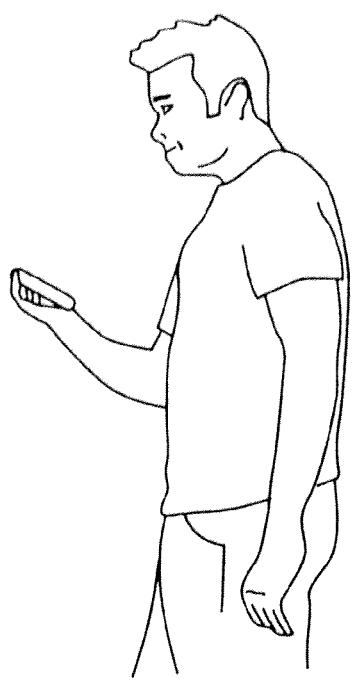
FIGS. 9A, 9B and 9C are views of user activities in accordance with embodiments of the inventions described herein.
Figure 9B:
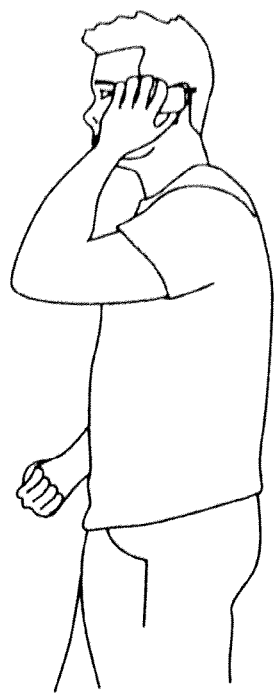
Figure 9C:
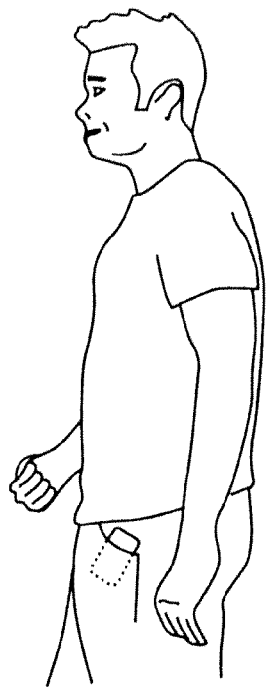

FIGS. 9A-C illustrate exemplary user activities that can be determined based on input data acquired by the one or more sensors of the portable device. Exemplary user activities include, but are not limited to, the user looking directly at the portable device (FIG. 9A), the user holding the portable device at or near their ear (FIG. 9B), the user putting the portable device in a pocket or purse (FIG. 9C), and the like.

Additional information about user activities and/or gestures that can be monitored in accordance with embodiments of the present invention are disclosed in U.S. patent application Ser. No. 10/903,964, titled "GESTURES FOR TOUCH SENSITIVE INPUT DEVICES," filed Jul. 30, 2004, U.S. patent application Ser. No. 11/038,590, titled "MODE-BASED GRAPHICAL USER INTERFACES FOR TOUCH SENSITIVE INPUT DEVICES," filed Jan. 18, 2005, all of which are incorporated herein by reference in their entirety.

A method will now be described for automatically responding to certain user activities with respect to a data processing system and/or a peripheral of the data processing system. This method includes, but is not limited to, gathering sensor data designed to indicate user activity with respect to a portable device and executing machine-executable code to perform one or more predetermined automated actions in response to the detection of the user activity, and this method may be performed by any one of the devices shown in FIGS. 4A-4D and the peripheral 201 and the data processing system 203 and may or may not use the artificial intelligence process shown in FIG. 8. The sensor data is gathered from one or more sensors; the sensor data provides information about user activity or device context. For example, a proximity sensor may indicate whether the device is near the user's ear; a temperature sensor, an ambient light sensor (or a differential ambient light sensor) and a proximity sensor may together indicate that the device is in the user's pocket; a gyroscope and a proximity sensor may together indicate that the user is looking at the device. The data from the one or more sensors is analyzed; this analysis may be performed by one or more processors within the device, including a processor within one or more of the sensors. The analysis attempts to predict user activity based on the sensor data. It will be appreciated that a prediction from this analysis may, in some cases, be wrong. For example, if a user places a finger over a proximity sensor when the user holds the device, this may cause the analysis to incorrectly conclude that the device is near the user's head or ear. After the analysis, one or more device settings may be adjusted based upon, at least in part, the analysis of the data from the one or more sensors. This adjusting may include changing an illumination setting of the device or other actions described herein.

Other examples of methods for sensing data and automatically responding to the sensed data are provided in U.S. patent application Ser. No. 11/586,862, filed on Oct. 24, 2006, and entitled "AUTOMATED RESPONSE TO AND SENSING OF USER ACTIVITY IN PORTABLE DEVICES," which application is incorporated herein by reference. It will be appreciated that several variations can be made to the illustrated methods, including variations to the data sensed, analysis of the data and the response(s) to the sensed data.

A mode of the device may be used in order to determine whether to or how to adjust a setting of the device. The mode of the device may include any one of a variety of modes or conditions, such as speakerphone mode or non-speakerphone mode, battery powered mode or not battery powered mode, call waiting mode or not call waiting mode, an alert mode in which the device may make a sound, such as the sound of an alarm, etc. The data relating to user activity (e.g. data from one or more sensors, such as a proximity sensor and/or a touch input panel, which is capable of detecting blobs from a face) is analyzed relative to the mode of the device and the analysis attempts to determine whether to adjust a setting of the device. One or more device settings may be adjusted based on the sensed user activity and the device mode. For example, the device may automatically switch from speakerphone mode to non-speakerphone mode when proximity data, and optionally other data (e.g. data from a motion sensor and an ambient light sensor) indicate the user has placed the device, which in this case may be a telephone, next to the user's ear. In this example, the device has automatically switched from speakerphone mode to non-speakerphone mode without any intentional input from the user which indicates that the switch should occur. Another method involves adjusting an alert or alarm volume depending on whether or not the device is near to the user's ear. In this example, if the data relating to user activity indicates that the device is adjacent to the user's ear and if the mode of the device is set such that alarms or alerts will cause the device to make a sound, then the device will automatically change the volume level for an alert or an alarm from a first level to a second level which is not as loud as the first level.

The phrase "proximity sensor" is used throughout to mean a sensor, such as a capacitive, temperature, inductive, infrared or other variety of sensor, which is capable of detecting whether an object is present within a certain distance of the sensor. A primary object of this detecting may be the head of the user (or any other object that would present viewing of the display screen).

Any of the embodiments of the inventions may include one or more user interface controls which allow a user to override a result caused by one or more sensors. For example, a control, such as a button, may be pressed by the user to cause the display to return to full power after a proximity sensor has caused the display to enter a reduced power consumption state. In another example, the user interface control may be a sensor (or group of sensors), such as an accelerometer, which detects a user interaction with the device (e.g. shaking the device), and the user interaction has been set up to cause an overriding of a state caused by one or more sensors.

Certain embodiments of the inventions may employ one or more light sensors which provide data relating to light, which data is analyzed to determine whether or not to adjust one or more settings of a device, such as wireless device 100. Ambient light level data may be provided by an ambient light sensor which indicates the level of light intensity surrounding that sensor. Ambient light differential data may be obtained from two or more ambient light sensors which are disposed at different positions on the device. For example, one ambient light sensor may be on one side of the device, and another ambient light sensor may be on another side of the device. A different in the light intensity levels may be determined by comparing the data from these two ambient light sensors on two different sides or surfaces of the device. There are a variety of possible uses of a light sensor. A light sensor may be used with a proximity sensor to determine when a device is placed in a pocket to cause the device to be set in vibrate mode only or vibrate mode with audible ringing. In another example, in response to a light sensor determining that the ambient light is very low, and optionally in response to a user having set the device to visibly light up to show an incoming call when the ambient light is very low, the device may automatically be put in a "light ring" mode when it is dark so that instead of an audible ring from the device, the display flashes visibly (e.g. by repeatedly turning on and off the backlight) to indicate an incoming call. Another exemplary use of a light sensor involves using it as an alarm indicating that a dark room (or environment) has become brighter (e.g. the sun has risen or a door to a darkened room is opened to let light into the room). A light sensor may also be used to cause a device to automatically act as a source of light (e.g. as a flashlight, in effect) upon sensing a low ambient light level.

Figure 10:
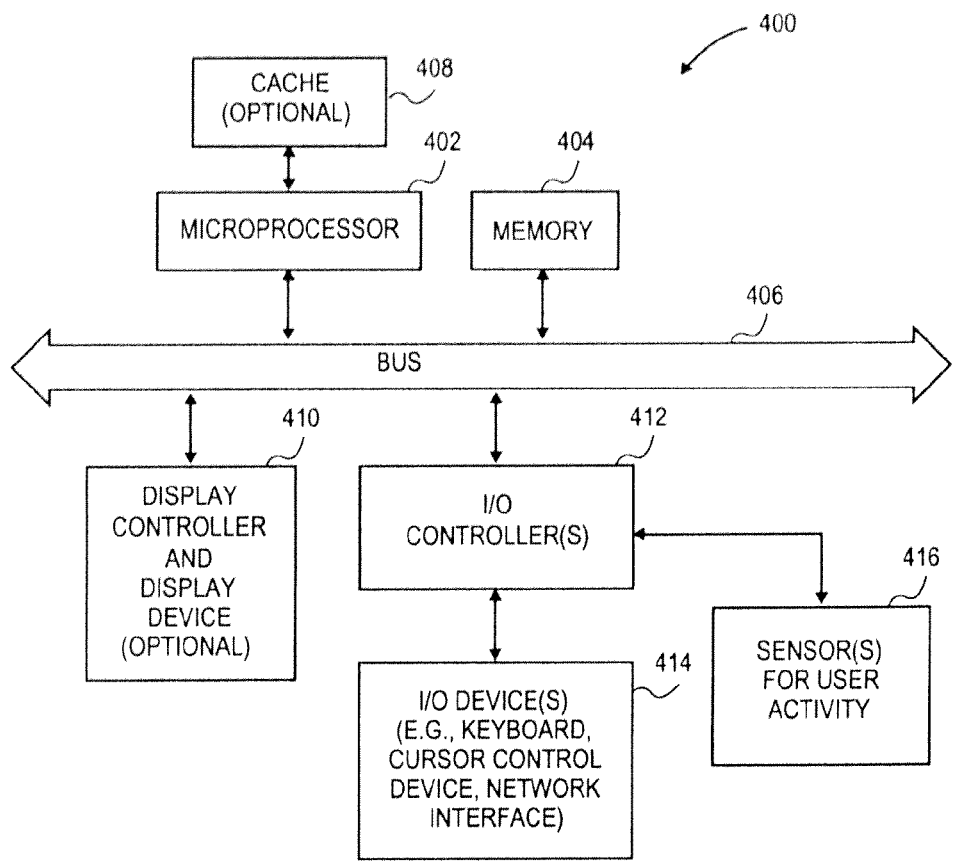
FIG. 10 shows, in block diagram form, an example of a data processing system which may be used with one or more embodiments described herein.

FIG. 10 shows another example of a device according to an embodiment of the inventions. This device may include a processor, such as microprocessor 402, and a memory 404, which are coupled to each other through a bus 406. The device 400 may optionally include a cache 408 which is coupled to the microprocessor 402. This device may also optionally include a display controller and display device 410 which is coupled to the other components through the bus 406. One or more input/output controllers 412 are also coupled to the bus 406 to provide an interface for input/output devices 414 and to provide an interface for one or more sensors 416 which are for sensing user activity. The bus 406 may include one or more buses connected to each other through various bridges, controllers, and/or adapters as is well known in the art. The input/output devices 414 may include a keypad or keyboard or a cursor control device such as a touch input panel. Furthermore, the input/output devices 414 may include at least one network interface which is either for a wired network or a wireless network (e.g. an RF transceiver such as a WiFi or WPAN RF transceiver). The sensors 416 may be any one of the sensors described herein including, for example, a proximity sensor or an ambient light sensor. In at least certain implementations of the device 400, the microprocessor 402 may receive data from one or more sensors 416 and may perform the analysis of that data in the manner described herein. For example, the data may be analyzed through an artificial intelligence process or in the other ways described herein. As a result of that analysis, the microprocessor 402 may then automatically cause an adjustment in one or more settings of the device.

FIGS. 11-16 relate to another aspect of the inventions described herein. In this aspect, the data processing system 203 may be considered itself a peripheral relative to another data processing system such as the data processing system 451 which may, in at least certain embodiments, be a general purpose computer system such as the system shown in FIG. 10. The system 450 shown in FIG. 11 includes the data processing system 451 which includes a network interface and a peripheral interface and storage. In at least certain embodiments, the data processing system 451 may be a general purpose computer system having a keyboard, and a cursor control device, and a display as well as a network interface to couple the data processing system to a network 459 which may be the Internet or other networks, such as a local area network or a telephone network or a cable TV system network. The network interface may connect to the network either through a wired connection or through a wireless connection and there may be a plurality of network interfaces for different networks or different methods of connecting to the same network or a plurality of networks. The data processing system typically includes non-volatile mass storage which may store user programs and an operating system and user data including address or contact information, calendar information, and URLs such as favorites or bookmarks for browsing the Internet. The peripheral interface of the data processing system 451 is used to couple the data processing system 451 to a dock or other connector for peripherals. The dock or other connector may be connected in a wired or wireless manner to the data processing system 451 through the peripheral interface. The dock or connector 453 is designed to connect to one or more peripherals, such as a first peripheral 457 which may be a wireless headset and a second peripheral 455 which may be a wireless cellular telephone which includes PDA functionality. In one embodiment, the data processing system 203 may be the second peripheral 455 and the peripheral 201 may be the first peripheral 457. The dock may mechanically hold both peripherals separately or at the same time and may also electrically connect to both peripherals to provide power to the peripherals, recharge the batteries of the peripherals, and to exchange data between the peripherals and the data processing system 451. The second peripheral 455 may include storage for user information, such as contacts, calendar, and URLs, which may be synchronized with the user's data of a similar type on the data processing system 451. The user may place one or both peripherals on the dock or connector 453 to cause certain actions to occur as described herein or may remove one or both peripherals to also cause certain actions to occur automatically as described herein. The dock and/or peripherals may include mechanical or electrical sensors to detect the placement of the peripheral on the dock or connector and the removal of the peripheral from the dock or connector.

Figure 12:
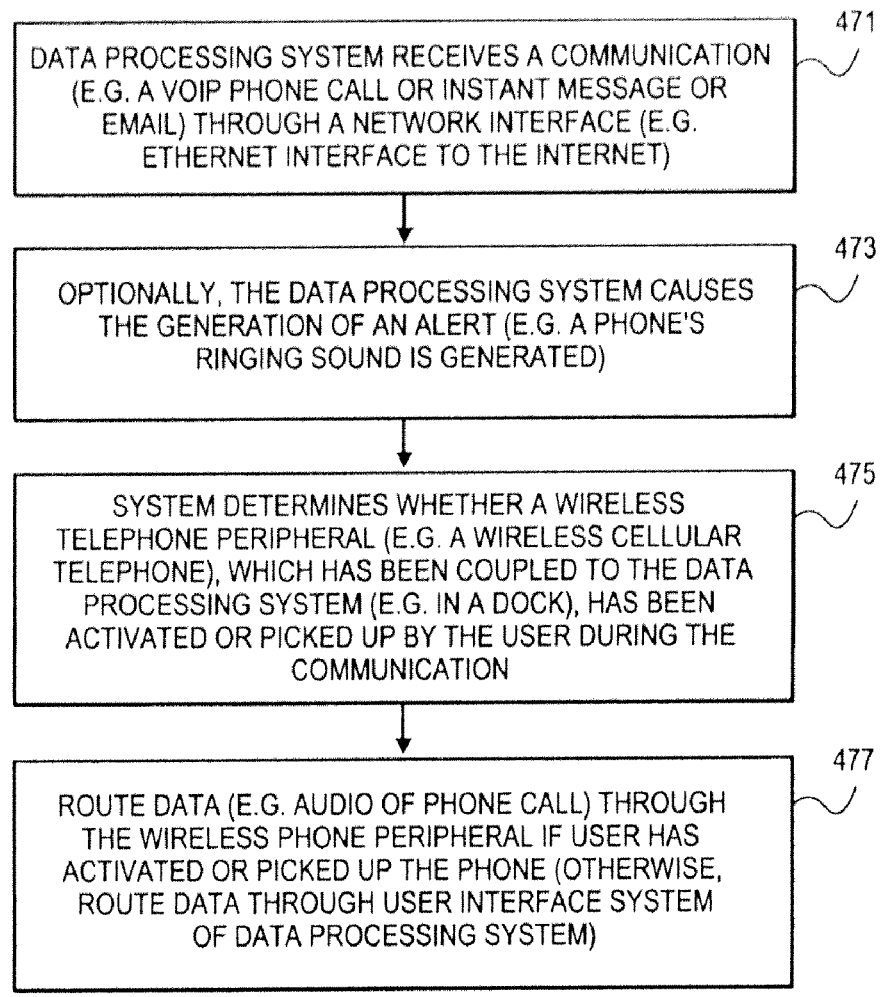
FIG. 12 is a flow chart which illustrates an embodiment of a method of the inventions described herein.

FIG. 12 shows an example of a method of operating the system 450. In this example, the first peripheral 457 is unnecessary, although it may be present and attached to the dock 453. In operation 471, the data processing system, such as the data processing system 451, receives a communication. This communication may be a voice over IP (VOIP) phone call through a network, such as the network 459, which may be the Internet. Alternatively, the communication may be an instant message or an email through the network 459. This communication is received through the network interface of the data processing system, such as the network interface of the data processing system 451. In operation 473, which is optional, the data processing system causes the generation of an alert. For example, the data processing system may cause the generation of a telephone's ringing sound. In operation 475, the system determines whether a wireless telephone peripheral, such as a wireless cellular telephone, which may be the second peripheral 455, has been activated or disconnected from the dock during the communication. This determination may occur through detecting that the second peripheral 455 has been removed from the dock or it may be determined through sensors on the second peripheral, such as proximity sensors and accelerometers and other sensors. The system may detect that the user has picked up the second peripheral 455 during the generation of the ringing sound or after the phone call has began and the ringing sound has stopped. In one embodiment, the routing operation shown in operation 477 may be invoked at any time during the communication, including after the ringing sound has ceased to be generated, or only during the generation of the ringing sound. In operation 477, the data from the communication, such as the audio data of the phone call, is routed through the wireless phone peripheral, such as the second peripheral 455, if the user has activated or picked up the phone during the communication. Otherwise, if the user does not pick up the phone during the communication, the data is routed through the user interface system of the data processing system, which may be speakers and a microphone as part of the input/output devices of the data processing system 451. It will be appreciated that in certain embodiments, the system may reverse the routing of data when the second peripheral 455 is placed back on the dock during the communication. It will be appreciated that the routing of data in operation 477 may be performed through a WiFi or WPAN interface on both the second peripheral 455 and the data processing system 451. This would enable the second peripheral 455 to still be able to use its wireless cellular transceiver for a telephone call over the wireless cellular network.

Figure 11:
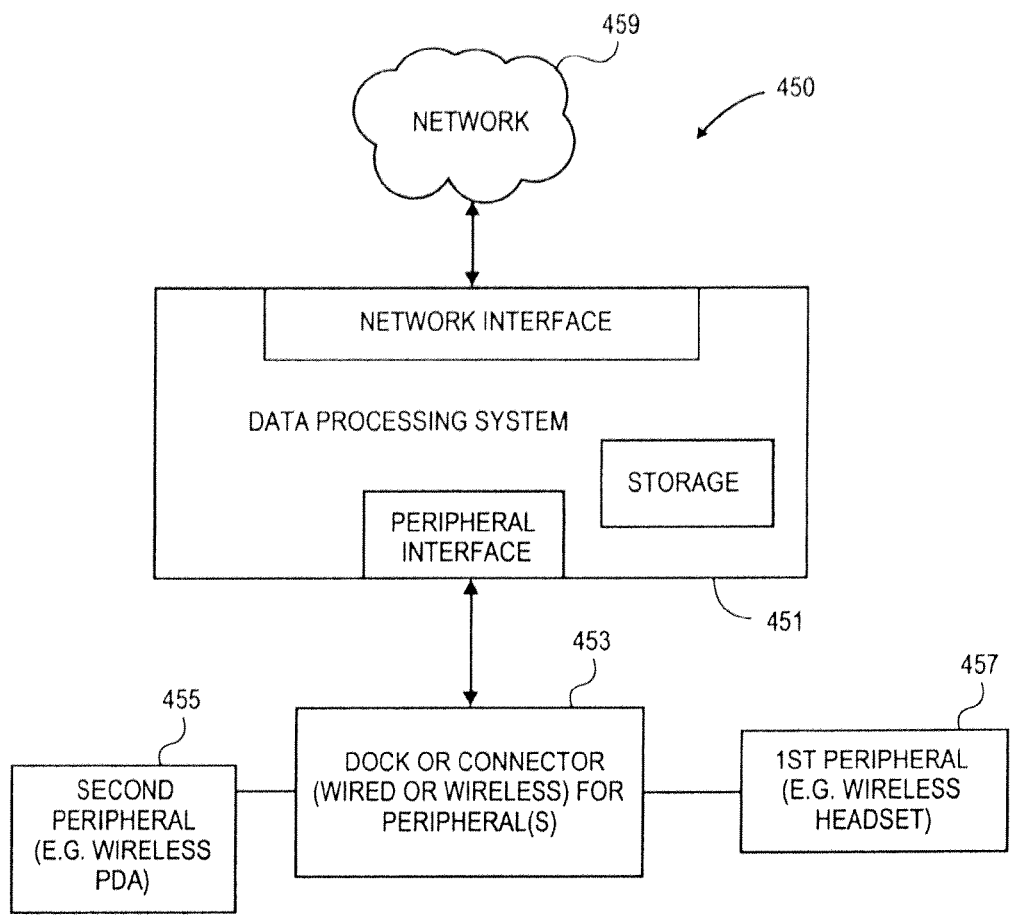
FIG. 11 shows, in block diagram form, a data processing system with two peripherals and a dock or other connector which couples the peripherals to the data processing system.
Figure 13:
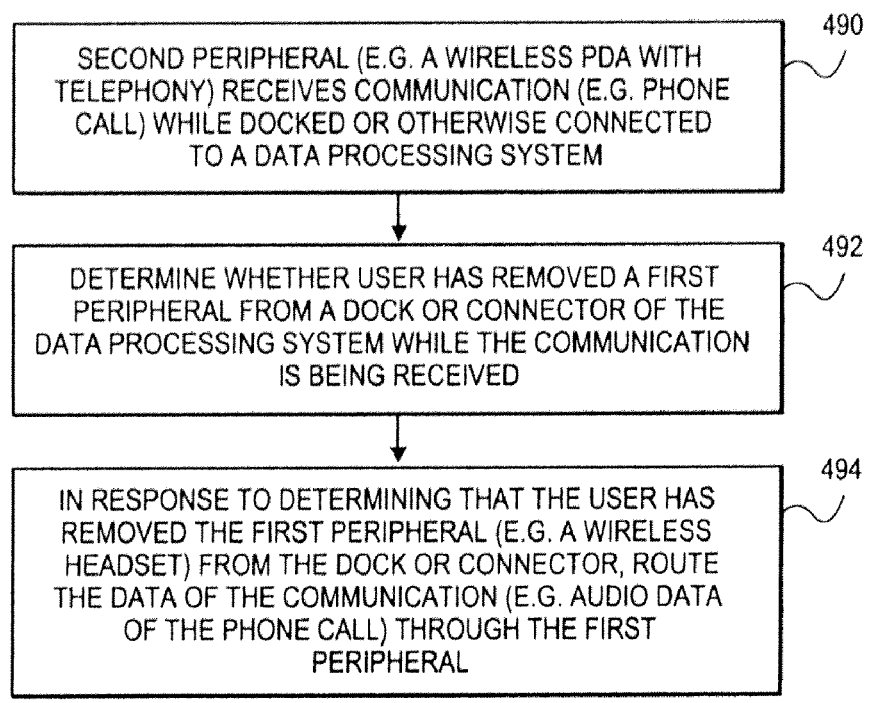
FIG. 13 is a flow chart which illustrates an embodiment of a method of the inventions described herein.

FIG. 13 shows another method which may be employed with the system 450 of FIG. 11. In this method, it is assumed that both the first peripheral 457 and the second peripheral 455 are coupled or connected to the dock or connector 453. In operation 490, the second peripheral, which may be a wireless cellular telephone with PDA functionality, receives a communication, such as a cellular telephone call, while being docked or otherwise connected to the data processing system, such as the data processing system 451. In operation 492, it is determined whether the user has removed a first peripheral, such as the first peripheral 457, from a dock or connector, such as the dock or connector 453, while the communication is being received. Then in operation 494, the data of the communication is routed through the first peripheral in response to determining that the user has removed the first peripheral, which may be a wireless headset, from the dock or connector. This will typically cause the speaker and microphone of the second peripheral 455 to be disabled so that the audio data of the phone call is provided only through the wireless headset or first peripheral 457. It will be appreciated that in certain embodiments, the routing of data may be reversed when the first peripheral is returned to the dock.

Figure 14:
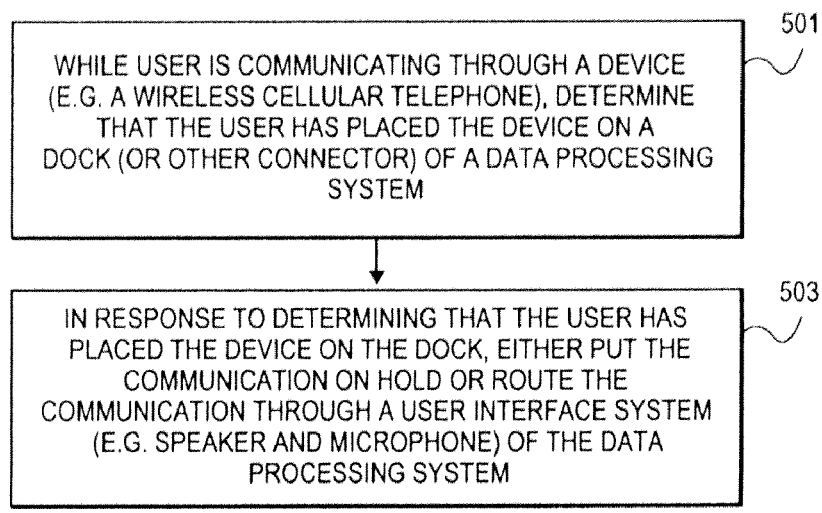
FIG. 14 is a flow chart which shows an embodiment of a method of the inventions described herein.

FIG. 14 shows another method of operating the system 450 shown in FIG. 11. In this case, it is assumed that the user is already communicating through a device, such as a wireless cellular telephone, which may be the second peripheral 455 before the method begins. In operation 501, it is determined that the user has placed the device on a dock or other connector of the data processing system while the user is communicating through the device. For example, operation 501 may determine that the second peripheral 455 has been placed on the dock or connected to a connector 453 while the user is in the process of communicating through the second peripheral. This communication may be a telephone call through a wireless cellular network using the second peripheral 455 as a wireless cellular telephone. Operation 503, in response to determining that the user has placed the device on the dock, either puts the communication on hold or routes the communication through the user interface of the data processing system, such as the data processing system 451. It will be appreciated that a reverse operation may occur following operation 503 in which the routing of the communication is returned to the cellular telephone. For example, following operation 503, the user may remove the cellular telephone from the dock and cause the communication to be routed back to the second peripheral 455 and to no longer use the speaker and microphone of the data processing system, such as the data processing system 451.

Figure 15:
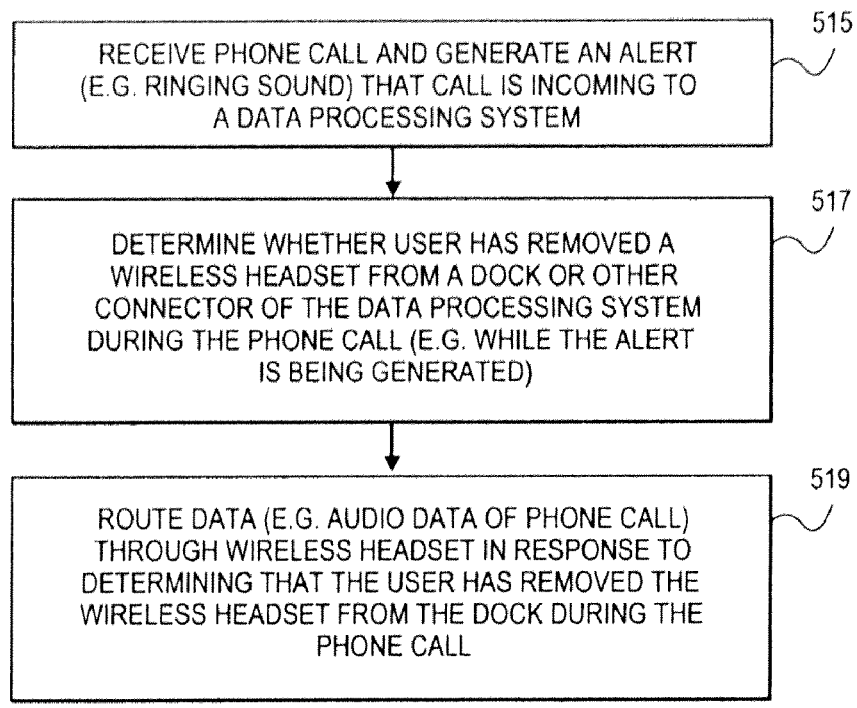
FIG. 15 is a flow chart showing another method.

FIG. 15 shows another example of a method of operating the system 450. In operation 515, a telephone call is received by a data processing system, such as the data processing system 451, which generates an alert, such as a ringing sound that the call is incoming. In one embodiment, the data processing system 451 may include a computer program and the necessary hardware to provide voice over IP (VOIP) functionality on the data processing system which can receive and make voice over IP phone calls through the data processing system. In operation 517, the system determines whether the user has removed the first peripheral 457, which may be a wireless headset from the dock or other connector of the data processing system during the phone call, such as while the alert is being generated or, in certain embodiments, during the phone call after the alert has been generated. If the system determines that the user has removed the wireless headset from the dock, then in operation 519, data from the phone call is routed through the wireless headset, rather than the speakers and microphone of the data processing system 451 in response to determining that the user has removed the wireless headset from the dock during the phone call.

Figure 16:
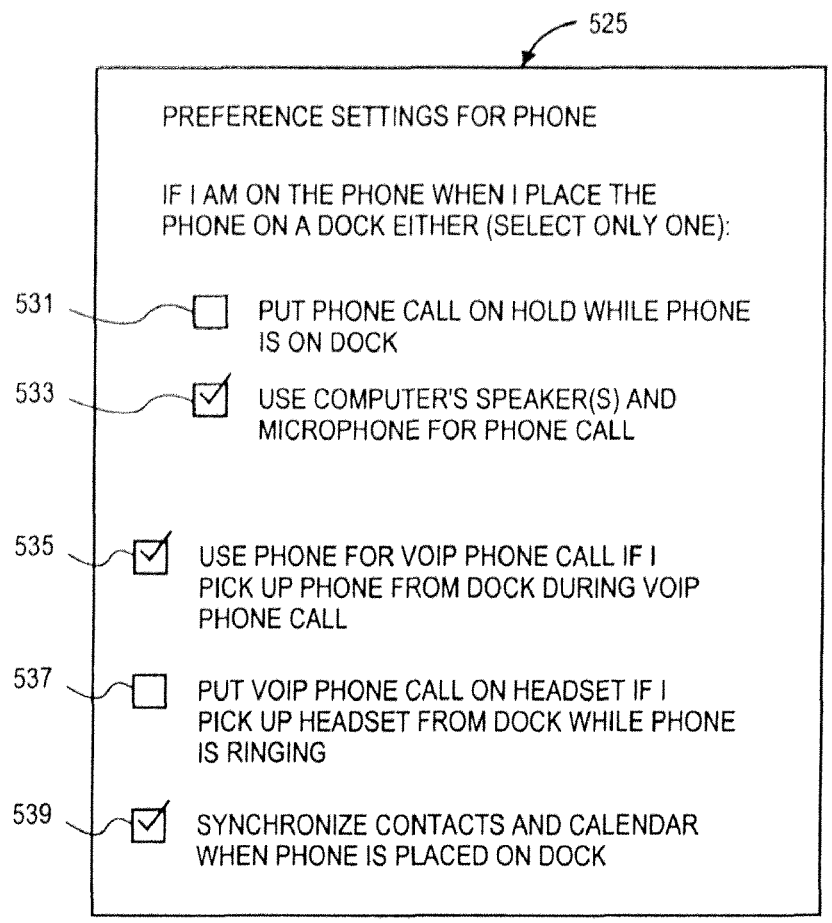
FIG. 16 shows an example of a user interface which may be used to set configuration or preference settings for a telephone, such as a wireless cellular telephone.

It will be appreciated that in at least certain embodiments, a user interface of a data processing system, such as the data processing system 451, may allow a user to set preferences or configuration parameters for a phone, such as the second peripheral 455 which may be used with the data processing system 451. FIG. 16 shows an example of a user interface which may be displayed on a display device of the data processing system 451. This user interface includes a window 525 which includes several possible preferences or options which can be set or not set by the user. If the user selects check box 531, then operation 503 shown in FIG. 14 will put the phone call on hold while the phone is placed on the dock if the user had been using the phone before placing the phone on the dock. If the user selects check box 533, then check box 531 becomes automatically unselected and the operation 503 causes the audio from the phone call to be routed through the audio system of the data processing system 451. Check box 535 allows a user to cause the system 450 to route audio of a VOIP phone call, received or initiated on the data processing system 451, through the audio system (e.g. speaker and microphone) of the second peripheral 455, which may be a wireless cellular telephone of the form shown as data processing system 203 in FIG. 1, in response to picking up the second peripheral from the dock during the VOIP phone call. Selecting check box 535 enables this functionality which is also shown in FIG. 12; FIG. 16 shows that check box 535 has been selected. If the user selects check box 537 (shown as unselected in FIG. 16), then the system 450 will put a VOIP phone call on the headset when the user picks up the headset from the dock while the phone is ringing. check box 539 allows a user to cause the user's data (e.g. contact, calendar data, URLs such as bookmarks, etc.) on the phone (e.g. the second peripheral 455) to be synchronized with the user's similar data on the data processing system (e.g. system 451) automatically in response to the phone being placed on the dock if the check box 539 is selected; if the check box 539 is not selected, this synchronization may be performed manually by the user selecting a synchronization command.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A data processing system comprising:
at least one processor;
a memory coupled to the processor;
a network interface configured to be coupled to a data network which is capable of providing voice over the data network, the network interface being coupled to the processor;
a connector interface configured to be coupled to a wireless mobile telephone which communicates through a wireless cellular network, the connector interface being coupled to the processor, wherein the processor is configured to route, automatically, data of a communication through the data network to the wireless mobile telephone in response to the wireless mobile telephone being disconnected from the connector interface during the communication.

2. The data processing system of claim 1 wherein the data of the communication is audio of a phone call through the data network which supports voice over the data network and wherein the connector interface is a dock and wherein the data processing system further comprises:

a radio frequency transceiver, coupled to the processor, for wirelessly communicating with the wireless mobile telephone through a wireless local area network (WLAN) or through a wireless personal area network (WPAN), and wherein the audio is routed through the WLAN or WPAN.

3. The data processing system of claim 1 wherein the data of the communication is an instant or text message through the data network.

4. The data processing system of claim 1 wherein the connector interface is configured to be coupled to a wireless headset which includes a speaker and a microphone, and wherein the wireless mobile telephone routes a communication through the wireless cellular network to the wireless headset in response to the wireless headset being disconnected from the connector interface during the communication through the wireless cellular network.

5. The data processing system as in claim 1 wherein the memory stores a contacts data structure and a calendar data structure and wherein the connector interface is configured to transfer data from the contacts data structure and the calendar data structure to the wireless mobile telephone when synchronizing the wireless mobile telephone with the data processing system.

6. The data processing system as in claim 1 wherein the memory stores a URL (Uniform Resource Locator) favorites data structure and wherein the connector interface is configured to transfer data from the URL favorites data structure to the wireless mobile telephone when synchronizing the wireless mobile telephone with the data processing system.

7. A machine readable medium containing executable program instructions to be executed by the processor of claim 1.

* * * * *